(12) United States Patent
Wang et al.

(10) Patent No.: US 11,930,220 B2
(45) Date of Patent: Mar. 12, 2024

(54) COMBINATION OF SUBPICTURES AND SCALABILITY

(71) Applicants: Beijing Bytedance Network Technology Co., Ltd., Beijing (CN); Bytedance Inc., Los Angeles, CA (US)

(72) Inventors: Ye-kui Wang, San Diego, CA (US); Li Zhang, San Diego, CA (US); Kai Zhang, San Diego, CA (US); Zhipin Deng, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/950,040

(22) Filed: Sep. 21, 2022

(65) Prior Publication Data

US 2023/0023220 A1    Jan. 26, 2023

Related U.S. Application Data

(63) Continuation of application No. PCT/CN2021/082029, filed on Mar. 22, 2021.

(30) Foreign Application Priority Data

Mar. 21, 2020  (WO) ................ PCT/CN2020/080533

(51) Int. Cl.
*H04N 19/46*   (2014.01)
*H04N 19/105*  (2014.01)
(Continued)

(52) U.S. Cl.
CPC ........... *H04N 19/70* (2014.11); *H04N 19/105* (2014.11); *H04N 19/172* (2014.11);
(Continued)

(58) Field of Classification Search
CPC .. H04N 19/105; H04N 19/172; H04N 19/187; H04N 19/30; H04N 19/46;
(Continued)

(56) References Cited

U.S. PATENT DOCUMENTS

2013/0202034 A1   8/2013   Yu
2014/0003539 A1   1/2014   Rodriguez et al.
(Continued)

FOREIGN PATENT DOCUMENTS

CN   104221384 A   12/2014
CN   105308971 A    2/2016
(Continued)

OTHER PUBLICATIONS

Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.
(Continued)

*Primary Examiner* — Anner N Holder
(74) *Attorney, Agent, or Firm* — Conley Rose, P.C.

(57) ABSTRACT

Several techniques for video encoding and video decoding are described. One example method includes performing a conversion between a subpicture in a video picture of a video and a bitstream of the video according to a rule. The rule specifies that, in in case a subpicture is treated as a video picture for the conversion, a cross-layer alignment restriction is applied to less than all of the multiple layers including a current layer that includes the subpicture and a subset of layers associated with the current layer.

20 Claims, 18 Drawing Sheets

(51) Int. Cl.
  *H04N 19/172* (2014.01)
  *H04N 19/187* (2014.01)
  *H04N 19/70* (2014.01)
  *H04N 19/96* (2014.01)
(52) U.S. Cl.
  CPC ........... *H04N 19/187* (2014.11); *H04N 19/46* (2014.11); *H04N 19/96* (2014.11)
(58) Field of Classification Search
  CPC ........ H04N 19/59; H04N 19/70; H04N 19/96; H04N 21/234309
  See application file for complete search history.

(56) References Cited

U.S. PATENT DOCUMENTS

| | | | |
|---|---|---|---|
| 2014/0016710 | A1 | 1/2014 | Rodriguez et al. |
| 2014/0254666 | A1 | 9/2014 | Rapaka et al. |
| 2014/0301436 | A1* | 10/2014 | Wang ............... H04N 19/70 375/240.02 |
| 2014/0301437 | A1 | 10/2014 | Wang |
| 2015/0016543 | A1 | 1/2015 | Rapaka |
| 2015/0023419 | A1 | 1/2015 | Chen |
| 2015/0078455 | A1 | 3/2015 | Rusert |
| 2015/0103924 | A1 | 4/2015 | Misra et al. |
| 2015/0181237 | A1 | 6/2015 | Tsukuba |
| 2018/0376154 | A1 | 12/2018 | Deshpande |
| 2019/0313104 | A1 | 10/2019 | Yu et al. |
| 2020/0045306 | A1 | 2/2020 | Lee |
| 2020/0244995 | A1 | 7/2020 | Hsiang |
| 2021/0227231 | A1 | 7/2021 | Hannuksela |
| 2021/0258596 | A1 | 8/2021 | Xu |
| 2021/0392325 | A1 | 12/2021 | Hsiang |
| 2022/0078486 | A1 | 3/2022 | Hannuksela |
| 2022/0086431 | A1 | 3/2022 | Wang |
| 2022/0086432 | A1 | 3/2022 | Wang |
| 2022/0086457 | A1 | 3/2022 | Wang |
| 2022/0086496 | A1 | 3/2022 | Wang |
| 2022/0103867 | A1 | 3/2022 | Wang |
| 2022/0132104 | A1 | 4/2022 | Zhang |
| 2022/0141488 | A1* | 5/2022 | He ............... H04N 19/597 375/240.12 |
| 2022/0141494 | A1 | 5/2022 | Deshpande |
| 2022/0217382 | A1 | 7/2022 | Zhang |
| 2022/0217385 | A1 | 7/2022 | Wang |
| 2022/0232259 | A1 | 7/2022 | Wang |
| 2022/0272330 | A1 | 8/2022 | Zhang |
| 2022/0295104 | A1 | 9/2022 | Lainema |
| 2022/0321919 | A1 | 10/2022 | Deshpande |
| 2022/0377353 | A1 | 11/2022 | Zhang |
| 2022/0394301 | A1 | 12/2022 | Deshpande |
| 2022/0394304 | A1 | 12/2022 | Deng |
| 2023/0007291 | A1 | 1/2023 | Samuelsson |
| 2023/0007309 | A1 | 1/2023 | Wang |

FOREIGN PATENT DOCUMENTS

| | | |
|---|---|---|
| CN | 107071494 A | 8/2017 |
| CN | 107439015 A | 12/2017 |
| CN | 110100440 A | 8/2019 |
| CN | 110944195 A | 3/2020 |
| JP | 2020017970 A | 1/2020 |
| JP | 2021150703 A | 9/2021 |
| WO | 2015131304 A1 | 9/2015 |
| WO | 2018207956 A1 | 11/2018 |
| WO | 2019004888 A1 | 1/2019 |
| WO | 2020004990 A1 | 1/2020 |
| WO | 2020005035 A1 | 1/2020 |
| WO | 2020069651 A1 | 4/2020 |
| WO | 2020228659 A1 | 11/2020 |
| WO | 2021034579 A1 | 2/2021 |
| WO | 2021172912 A1 | 9/2021 |
| WO | 2021172914 A1 | 9/2021 |

OTHER PUBLICATIONS

"Information Technology—High efficiency coding and media delivery in heterogeneous environments—Part 2: High efficiency Video Coding", Rec. ITU-T H.265 | ISO/IEC 23008-2 (in force edition), ISO/IEC JTC 1/SC 29/WG 11 N17661, Apr. 20, 2018, 8 pages.

Document: JVET-G1001-v1, Chen, J., et al., "Algorithm description of Joint Exploration Test Model 7 (JEM7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.

Document: JVET-Q2002-v3, Chen, J., et al., "Algorithm description for Versatile Video Coding and Test Model 8 (VTM B)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.

Li, X., VTM software: https://vcgit.hhi.fraunhofer.de/jvet/VVCSoftware_VTM.git, Dec. 19, 2022, 3 pages.

"Information technology—Coding of audio-visual objects—Part 12: ISO base media file format, Technical Corrigendum 1," ISO/IEC 14496-12, Jun. 3, 2016, 303 pages.

Qualcomm Inc, "Editor's Version of DASH Is 4th Edition," ISO/IEC JTC1/SC29/WG11 MPEG2019/m52458, ISO/IEC 23009-1, Jan. 2020, 287 pages.

Document: JCTVC-AC1005-v2, Boyce, J., et al., "HEVC Additional Supplemental Enhancement Information (Draft 4)," Joint Collaborative Team on Video Coding (JCT-VC) of ITU-T SG 16 WP 3 and ISO/IEC JTC 1/SC 29/WG 11 29th Meeting: Macao, CN, Oct. 19-25, 2017, 56 pages.

Document: JVET-R0194, Hendry, "AHG8/AHG9: On parameter set sharing in multi-layered bitstream," Joint Video Experts Team (JVET) of ITU-T SG 16 WP 3 and ISO/IEC JTC 1/SC 29/WG 11 18th Meeting: by teleconference, Apr. 15-24, 2020, 4 pages.

Document: JVET-R0058-v5, Wang, Y-K., et al., "AHG8/AHG9/AHG12: On the combination of RPR, subpictures, and scalability," Joint Video Experts Team (JVET) of ITU-T SG 16 WP 3 and ISO/IEC JTC 1/SC 29/WG 11 18th Meeting: by teleconference, Apr. 15-24, 2020, 10 pages.

Document: JVET-Q0184-v1, Chiu, C-Y., et al., "AHG9: On signalling of wrap-around motion compensation," Joint Video Experts Team (JVET) of ITU-T SG 16 WP 3 and ISO/IEC JTC 1/SC 29/WG 11 17th Meeting: Brussels, BE, Jan. 7-17, 2020, 5 pages.

Document: JVET-M0266, Zhang, K., et al., "CE2-related: History-based affine merge candidates," Joint Video Experts Team (JVET) of ITU-T SG 16 WP 3 and ISO/IEC JTC 1/SC 29/WG 11 13th Meeting: Marrakech, MA, Jan. 9-18, 2019, 2 pages.

Document: JVET-Q0285, Choi, B., et al., "AHG9: On adaptation parameter set identification," Joint Video Experts Team (JVET) of ITU-T SG 16 WP 3 and ISO/IEC JTC 1/SC 29/WG 11 17th Meeting: Brussels, BE, Jan. 7-17, 2020, 4 pages.

Document: JVET-O0561, Paluri, S., et al., "AHG17: APS ID Control Mechanism," Joint Video Experts Team (JVET) of ITU-T SG 16 WP 3 and ISO/IEC JTC 1/SC 29/WG 11 15th Meeting: Gothenburg, SE, Jul. 3-12, 2019, 5 pages.

Document: JVET-Q0409_r1, Ouedraogo, N., et al., "AHG12: On APS id for bitstream merging for VVC," Joint Video Experts Team (JVET) of ITU-T SG 16 WP 3 and ISO/IEC JTC 1/SC 29/WG 11 17th Meeting: Brussels, BE, Jan. 7-17, 2020, 8 pages.

Document: JVET-S0049-v1, Wang, Y-K., et al., "AHG9/AHG8/AHG12: On parameter sets and picture header," Joint Video Experts Team (JVET) of ITU-T SG 16 WP 3 and ISO/IEC JTC 1/SC 29/WG 11 19th Meeting: by teleconference, Jun. 22-Jul. 1, 2020, 6 pages.

Document: JVET-P0593-v2, Seregin, V., et al., "AHG8/CE1-related: Signalling filter coefficients for resampling," Joint Video Experts Team (JVET) of ITU-T SG 16 WP 3 and ISO/IEC JTC 1/SC 29/WG 11 16th Meeting: Geneva, CH, Oct. 1-11, 2019, 11 pages.

Document: JVET-P0590-v3, Seregin, V., et al., "AHG8: Scaling window for scaling ratio derivation," Joint Video Experts Team (JVET) of ITU-T SG 16 WP 3 and ISO/IEC JTC 1/SC 29/WG 11 16th Meeting: Geneva, CH, Oct. 1-11, 2019, 5 pages.

Document: JVET-R0114-v3, Samuelsson, J., et al., "AHG 9: On scaling window offsets," Joint Video Experts Team (JVET) of ITU-T SG 16 WP 3 and ISO/IEC JTC 1/SC 29/WG 11 18th Meeting: by teleconference, Apr. 15-24, 2020, 4 pages.

(56) References Cited

OTHER PUBLICATIONS

Document: JVET-M0259, Hannuksela, M., et al., "Use cases and proposed design choices for adaptive resolution changing (ARC)," Joint Video Experts Team (JVET) of ITU-T SG 16 WP 3 and ISO/IEC JTC 1/SC 29/WG 11 13th Meeting: Marrakech, MA, Jan. 9-18, 2019, 10 pages.
Foreign Communication From a Related Counterpart Application, PCT Application No. PCT/CN2021/082024, English Translation of International Search Report dated Jun. 18, 2021, 15 pages.
Foreign Communication From a Related Counterpart Application, PCT Application No. PCT/CN2021/082029, English Translation of International Search Report dated Jun. 23, 2021, 14 pages.
Foreign Communication From a Related Counterpart Application, PCT Application No. PCT/CN2021/087963, English Translation of International Search Report dated Jul. 22, 2021, 15 pages.
Foreign Communication From a Related Counterpart Application, PCT Application No. PCT/CN2021/088054, English Translation of International Search Report dated Jul. 15, 2021, 10 pages.
Foreign Communication From a Related Counterpart Application, PCT Application No. PCT/CN2021/088056, English Translation of International Search Report dated Jul. 26, 2021, 11 pages.
Foreign Communication From a Related Counterpart Application, PCT Application No. PCT/CN2021/100316, English Translation of International Search Report dated Sep. 15, 2021, 10 pages.
Document: JVET-R2001-vB, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 86 pages.
Document: JVET-Q0402-v2, Skupin, R., et al., "AHG12: On subpicture and scalability," Joint Video Experts Team (JVET) of ITU-T SG 16 WP 3 and ISO/IEC JTC 1/SC 29/WG 11 17th Meeting: Brussels, BE, Jan. 7-17, 2020, 7 pages.
Document: JVET-Q2001-vD, Bross, B., et al., "Versatile Video Coding (Draft 8),"Joint Video Experts Team (JVET) of ITU-T SG 16 WP 3 and ISO/IEC JTC 1/SC 29/WG 11 17th Meeting: Brussels, BE, Jan. 7-17, 2020, 511 pages.
Foreign Communication From a related Counterpart Application, European Application No. 21775815.0, Extended European Search Report dated May 19, 2023, 10 pages.
Non-Final Office Action dated Apr. 4, 2023, 17 pages, U.S. Appl. No. 17/968,958, filed Oct. 19, 2022.
Non-Final Office Action dated May 10, 2023, 24 pages, U.S. Appl. No. 18/083,965, filed Dec. 19, 2022.
Non-Final Office Action dated Jan. 24, 2023, 25 pages, U.S. Appl. No. 17/949,938, filed Sep. 21, 2022.
Document: JVET-Q0043, Nishi, T., et al., "AHG9: Constraint about usage of reference picture resampling and subpictures," Joint Video Experts Team (JVET) of ITU-T SG 16 WP 3 and ISO/IEC JTC 1/SC 29/WG 11 17th Meeting: Brussels, BE, Jan. 7-17, 2020, 2 pages.
Document: JVET-Q0262, Samuelsson, J., et al., "AHG9: On reference picture resampling enabled flag," Joint Video Experts Team (JVET) of ITU-T SG 16 WP 3 and ISO/IEC JTC 1/SC 29/WG 11 17th Meeting: Brussels, BE, Jan. 7-17, 2020, 2 pages.
Document: JVET-P2001-vE, Bross, B., et al., "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 491 pages.
Document: JVET-R0271, Nalci, A., et al., "AHG9: High-level constraints of dependent quantization and sigh data hiding," Joint Video Experts Team (JVET) of ITU-T SG 16 WP 3 and ISO/IEC JTC 1/SC 29/WG 11 18th Meeting: by teleconference, Apr. 15-24, 2020, 4 pages.
Document: JVET-R0049, Hsiang, S., et al., "AHG9: HLS on disabling TSRC," Joint Video Experts Team (JVET) of ITU-T SG 16 WP 3 and ISO/IEC JTC 1/SC 29/WG 11 18th Meeting: by teleconference, Apr. 15-24, 2020, 4 pages.
Document: JVET-R0483, Sarwer, M., et al., "AGH9: Combination of JVET-R0049 and JVET-R0271," Joint Video Experts Team (JVET) of ITU-T SG 16 WP 3 and ISO/IEC JTC 1/SC 29/WG 11 18th Meeting: by teleconference, Apr. 15-24, 2020, 8 pages.
Extended European Search Report from European Application No. 21775439.9 dated Jul. 20, 2023, 12 pages.
Extended European Search Report from European Application No. 21792750.8 dated Aug. 10, 2023, 17 pages.
Document: JVET-S0174-v1, Skupin, R., et al., "AHG9: Miscellaneous cleanups," Joint Video Experts Team (JVET) of ITU-T SG 16 WP 3 and ISO/IEC JTC 1/SC 29/WG 11 19th Meeting: by teleconference, Jun. 22-Jul. 1, 2020, 4 pages.
Document: JVET-S0236-v1, Hsiang, S., et al., "AHG9/AHG12: High-level syntax cleanups on subpictures," Joint Video Experts Team (JVET) of ITU-T SG 16 WP 3 and ISO/IEC JTC 1/SC 29/WG 11 19th Meeting: by teleconference, Jun. 22-Jul. 1, 2020, 4 pages.
Document: JVET-R0114, Samuelsson, J., et al., "AHG9: On scaling window offsets," Joint Video Experts Team (JVET) of ITU-T SG 16 WP 3 and ISO/IEC JTC 1/SC 29/WG 11 18th Meeting: by teleconference, Jun. 22-Jul. 1, 2020, 4 pages.
Document: JVET-K0184, Esenlik, S., et al., "AHG9: On dependent slices syntax," Joint Video Experts Team (JVET) of ITU-T SG 16 WP 3 and ISO/IEC JTC 1/SC 29/WG 11 11th Meeting: Shanghai, CN, Oct. 10-19, 2012, 5 pages.
Document: JVET-R0483-v1, Sarwer, M., et al., "AHG9: Combination of JVET-R0049 and JVET-R0271," Joint Video Experts Team (JVET) of ITU-T SG 16 WP 3 and ISO/IEC JTC 1/SC 29/WG 11 18th Meeting: by teleconference, Apr. 15-24, 2020, 8 pages.
Document: JVET-R0480-v2, Zhang, L., et al., "AHG9: Restricted maximum numbers of ALF and CC-ALF filters," Joint Video Experts Team (JVET) of ITU-T SG 16 WP 3 and ISO/IEC JTC 1/SC 29/WG 11 18th Meeting: by teleconference, Apr. 15-24, 2020, 8 pages.
Extended European Search Report from European Application No. 21792750.8 dated Nov. 28, 2023, 18 pages.
Extended European Search Report from European Application No. 21825656.8 dated Feb. 10, 2023, 11 pages.

* cited by examiner

1500

1510 performing a conversion between a video comprising multiple layers and a bitstream of the video according to a rule specifying that, in case a subpicture is treated as a video picture for the conversion, a cross-layer alignment restriction is applied to less than all of the multiple layers comprising a current layer that includes the subpicture and a subset of layers associated with the current layer, wherein the cross-layer alignment restriction includes a restriction of at least a dimension of the video picture, a number of subpictures within the video picture, a location of at least one subpicture, or an identify of a subpicture

1610 — performing a conversion between a current layer of a video and a bitstream of the video according to a rule specifying that a cross-layer alignment restriction is applied to all layers in a dependency tree associated with the current layer regardless of whether any of the all layers is an output layer in an output layer set, where the all layers in the dependency tree include the current layer, all layers that have the current layer as a reference layer, and all reference layers of the current layer

FIG. 16

1700 → performing a conversion between a current picture of a video and a bitstream of the video according to a rule specifying that resampling of a reference picture that is in a same layer as the current picture is enabled regardless of a value of a syntax element specifying whether a change of a picture resolution is allowed in a Coded Layer Video Sequence (CLVS) — 1710

FIG. 17 performing a conversion between a current picture of a video comprising multiple layers and a bitstream of the video according to a rule specifying one of: (1) a reference picture of the current picture is disallowed to be collocated, or (2) in case that the reference picture of the current picture is collocated, motion vectors pointing to the reference picture are used during the conversion of the current picture without scaling

1910: performing a conversion between a video and a bitstream of the video according to a rule specifying that a scaling window offset parameter is same for any two video pictures in a same Coded Layer Video Sequence (CLVS) or a Coded Video Sequence (CVS) that have a same dimension represented in a number of luma samples

2010 — performing a conversion between a current picture of a video and a bitstream of the video according to a rule specifying that, in response to a picture resolution of the current picture being different than at least one other picture in a same access unit of the current picture, an inter-layer prediction coding tool is enabled only in case that the current picture is an intra random access point (IRAP) picture

FIG. 20

COMBINATION OF SUBPICTURES AND SCALABILITY

CROSS REFERENCE TO RELATED APPLICATIONS

This application is a continuation of International Application No. PCT/CN2021/082029, filed on Mar. 22, 2021, which claims the priority to and benefits of International Patent Application No. PCT/CN2020/080533, filed on Mar. 21, 2020. For all purposes under the law, the entire disclosure of the aforementioned application is incorporated by reference as part of the disclosure of this application.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for processing coded representation of video using control information useful for decoding of the coded representation.

In one example aspect, a video processing method is disclosed. The method includes performing a conversion between a current picture of a video and a bitstream of the video according to a rule. The rule specifies that multiple syntax elements are used to specify usage of a reference picture resampling tool in which a reference picture that has a different resolution than the current picture is resampled for the conversion.

In another example aspect, a video processing method is disclosed. The method includes performing a conversion between a current picture of a video and a bitstream of the video according to a rule. The rule specifies that a syntax element that has a non-binary value is used to specify usage of (1) a reference picture resampling tool in which a reference picture that has a different resolution than the current picture is resampled and (2) a change of a picture resolution within a Coded Layer Video Sequence (CLVS).

In another example aspect, a video processing method is disclosed. The method includes performing a conversion between a video comprising multiple layers and a bitstream of the video according to a rule. The rule specifies that, in case a subpicture is treated as a video picture for the conversion, a cross-layer alignment restriction is applied to less than all of the multiple layers comprising a current layer that includes the subpicture and a subset of layers associated with the current layer, wherein the cross-layer alignment restriction includes a restriction of at least a dimension of the video picture, a number of subpictures within the video picture, a location of at least one subpicture, or an identification of a subpicture.

In another example aspect, a video processing method is disclosed. The method includes performing a conversion between a current layer of a video and a bitstream of the video according to a rule. The rule specifies that a cross-layer alignment restriction is applied to all layers in a dependency tree associated with the current layer regardless of whether any of the all layers is an output layer in an output layer set. The cross-layer alignment restriction includes a restriction of at least a dimension of a video picture, a number of subpictures within a video picture, a location of at least one subpicture, or an identification of a subpicture. The all layers in the dependency tree include the current layer, all layers that have the current layer as a reference layer, and all reference layers of the current layer.

In another example aspect, a video processing method is disclosed. The method includes performing a conversion between a current picture of a video and a bitstream of the video according to a rule. The rule specifies that resampling of a reference picture that is in a same layer as the current picture is enabled regardless of a value of a syntax element specifying whether a change of a picture resolution is allowed in a Coded Layer Video Sequence (CLVS).

In another example aspect, a video processing method is disclosed. The method includes performing a conversion between a current picture of a video comprising multiple layers and a bitstream of the video according to a rule. The rule specifies one of (1) a reference picture of the current picture is disallowed to be collocated, or (2) in case that the reference picture of the current picture is collocated, then motion vectors pointing to the reference picture are used during the conversion of the current picture without scaling.

In another example aspect, a video processing method is disclosed. The method includes performing a conversion between a video and a bitstream of the video according to a rule. The rule specifies that a scaling window offset parameter is same for any two video pictures in a same Coded Layer Video Sequence (CLVS) or a Coded Video Sequence (CVS) that have a same dimension represented in a number of luma samples.

In another example aspect, a video processing method is disclosed. The method includes performing a conversion between a current picture of a video and a bitstream of the video according to a rule. The rule specifies that, in response to a picture resolution of the current picture being different than at least one other picture in a same access unit of the current picture, an inter-layer prediction coding tool is enabled only in case that the current picture is an intra random access point (IRAP) picture.

In another example aspect, a video processing method is disclosed. The method includes performing a conversion between a video comprising one or more video pictures, wherein the coded representation conforms to a format rule; wherein the format rule specifies that two or more syntax fields in a sequence parameter set controls a reference picture resampling (RPR) change in the video.

In another example aspect, another video processing method is disclosed. The method includes performing a conversion between a video comprising one or more video pictures, wherein the coded representation conforms to a format rule; wherein the format rule specifies that a single syntax field in a sequence parameter set controls a reference picture resampling (RPR) change in the video; and wherein, the format rule specifies that, irrespective of a value of the single syntax field, resampling of an inter-layer reference picture is permitted for the conversion.

In another example aspect, another video processing method is disclosed. The method includes performing a conversion between a video comprising one or more layers comprising one or more video pictures comprising one or more subpictures, wherein the coded representation conforms to a format rule; wherein the format rule specifies a first constraint on a cross-layer alignment or a second constraint on a combination of subpictures and scalability of inter-layer pictures.

In another example aspect, another video processing method is disclosed. The method includes performing a conversion between a video comprising one or more layers comprising one or more video pictures comprising one or more subpictures, wherein the conversion conforms to a format rule that specifies that an inter-layer reference picture or a long term reference picture is disallowed from being a collocated picture of a current picture for the conversion.

In another example aspect, another video processing method is disclosed. The method includes performing a conversion between a video comprising multiple pictures and a coded representation of the video, wherein the conversion conforms to a rule that specifies that values of each of scaling_win_left_offset, scaling_win_right_offset, scaling_win top offset, and scaling_win_bottom_offset are same for any two pictures within a same coded layer video sequence or coded video sequence having the same values of pic_width_in_luma_samples and pic_height_in_luma_samples.

In another example aspect, another video processing method is disclosed. The method includes performing a conversion between a video comprising multiple pictures and a coded representation of the video, wherein the conversion conforms to a rule that specifies that in case that a picture resolution or a scaling window is different for a current picture and other picture in a same access unit, then inter-layer prediction is only allowed when the current picture is an intra random access point picture.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

These, and other, features are described throughout the present document.

BRIEF DESCRIPTION OF DRAWINGS

FIG. 15 is a flowchart representation of another method for video processing in accordance with the present technology.

FIG. 16 is a flowchart representation of another method for video processing in accordance with the present technology.

FIG. 17 is a flowchart representation of another method for video processing in accordance with the present technology.

FIG. 18 is a flowchart representation of another method for video processing in accordance with the present technology.

FIG. 19 is a flowchart representation of another method for video processing in accordance with the present technology.

FIG. 20 is a flowchart representation of yet another method for video processing in accordance with the present technology.

DETAILED DESCRIPTION

Figure 2:
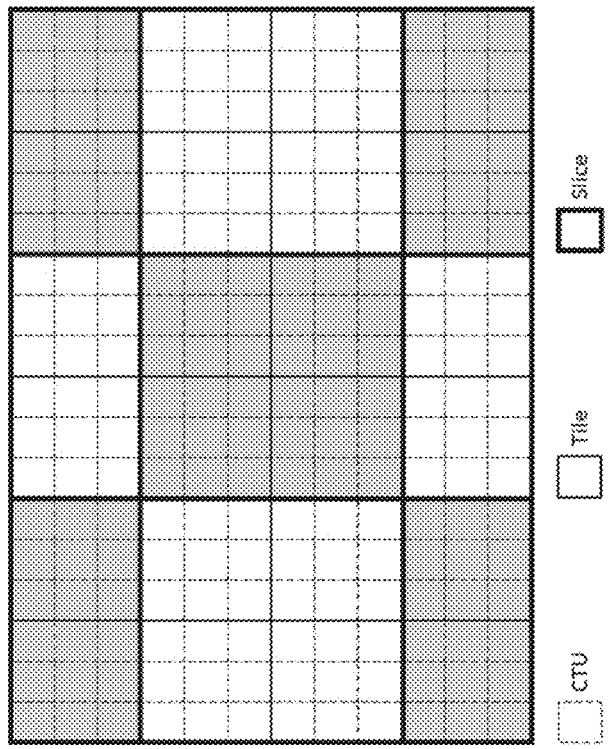
FIG. 2 shows an example of rectangular slice partitioning of a picture, where the picture is divided into 24 tiles (6 tile columns and 4 tile rows) and 9 rectangular slices.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also. In the present document, editing changes are shown to text by strikethrough indicating cancelled text and highlight indicating added text (including boldface italic), with respect to the current draft of the VVC specification.

1. Overview

This document is related to video coding technologies. Specifically, it is about 1) the combination of two or more of reference picture resampling (RPR), subpictures, and scalability in video coding, 2) the use of RPR between a current picture and a reference pictures that have the same spatial resolution, and 3) the combination of long-term reference picture and collocated picture. The ideas may be applied individually or in various combination, to any video coding standard or non-standard video codec that supports multi-layer video coding, e.g., the being-developed Versatile Video Coding (VVC).

2. Abbreviations

APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
DCI Decoding Capability Information
DPB Decoded Picture Buffer
EOB End Of Bitstream
EOS End Of Sequence
GDR Gradual Decoding Refresh
HEVC High Efficiency Video Coding
HRD Hypothetical Reference Decoder
IDR Instantaneous Decoding Refresh
ILP Inter-Layer Prediction
ILRP Inter-Layer Reference Picture
IRAP Intra Random Access Picture
JEM Joint Exploration Model
LTRP Long-Term Reference Picture
MCTS Motion-Constrained Tile Sets
NAL Network Abstraction Layer
OLS Output Layer Set
PH Picture Header
PPS Picture Parameter Set
PTL Profile, Tier and Level
PU Picture Unit
RAP Random Access Point
RBSP Raw Byte Sequence Payload
SEI Supplemental Enhancement Information
SPS Sequence Parameter Set
STRP Short-Term Reference Picture
SVC Scalable Video Coding
VCL Video Coding Layer
VPS Video Parameter Set
VTM VVC Test Model
VUI Video Usability Information
VVC Versatile Video Coding

3. Initial Discussion

Video coding standards have evolved primarily through the development of the well-known International Telecommunication Union—Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion, Final Draft International Standard (FDIS), at the July 2020 meeting.

3.1. Picture Partitioning Schemes in HEVC

HEVC includes four different picture partitioning schemes, namely regular slices, dependent slices, tiles, and Wavefront Parallel Processing (WPP), which may be applied for Maximum Transfer Unit (MTU) size matching, parallel processing, and reduced end-to-end delay.

Regular slices are similar as in H.264/AVC. Each regular slice is encapsulated in its own network abstraction layer (NAL) unit, and in-picture prediction (intra sample prediction, motion information prediction, coding mode prediction) and entropy coding dependency across slice boundaries are disabled. Thus a regular slice can be reconstructed independently from other regular slices within the same picture (though there may still have interdependencies due to loop filtering operations).

The regular slice is the only tool that can be used for parallelization that is also available, in virtually identical form, in H.264/AVC. Regular slices based parallelization does not require much inter-processor or inter-core communication (except for inter-processor or inter-core data sharing for motion compensation when decoding a predictively coded picture, which is typically much heavier than inter-processor or inter-core data sharing due to in-picture prediction). However, for the same reason, the use of regular slices can incur substantial coding overhead due to the bit cost of the slice header and due to the lack of prediction across the slice boundaries. Further, regular slices (in contrast to the other tools mentioned below) also serve as the key mechanism for bitstream partitioning to match MTU size requirements, due to the in-picture independence of regular slices and that each regular slice is encapsulated in its own NAL unit. In many cases, the goal of parallelization and the goal of MTU size matching place contradicting demands to the slice layout in a picture. The realization of this situation led to the development of the parallelization tools mentioned below.

Dependent slices have short slice headers and allow partitioning of the bitstream at treeblock boundaries without breaking any in-picture prediction. Basically, dependent slices provide fragmentation of regular slices into multiple NAL units, to provide reduced end-to-end delay by allowing a part of a regular slice to be sent out before the encoding of the entire regular slice is finished.

In WPP, the picture is partitioned into single rows of coding tree blocks (CTBs). Entropy decoding and prediction are allowed to use data from CTBs in other partitions. Parallel processing is possible through parallel decoding of CTB rows, where the start of the decoding of a CTB row is delayed by two CTBs, so to ensure that data related to a CTB above and to the right of the subject CTB is available before the subject CTB is being decoded. Using this staggered start (which appears like a wavefront when represented graphically), parallelization is possible with up to as many processors/cores as the picture contains CTB rows. Because in-picture prediction between neighboring treeblock rows within a picture is permitted, the required inter-processor/inter-core communication to enable in-picture prediction can be substantial. The WPP partitioning does not result in the production of additional NAL units compared to when it is not applied, thus WPP is not a tool for MTU size matching. However, if MTU size matching is required, regular slices can be used with WPP, with certain coding overhead.

Tiles define horizontal and vertical boundaries that partition a picture into tile columns and rows. Tile column runs from the top of a picture to the bottom of the picture. Likewise, tile row runs from the left of the picture to the right of the picture. The number of tiles in a picture can be derived simply as number of tile columns multiply by number of tile rows.

The scan order of CTBs is changed to be local within a tile (in the order of a CTB raster scan of a tile), before decoding the top-left CTB of the next tile in the order of tile raster scan of a picture. Similar to regular slices, tiles break in-picture prediction dependencies as well as entropy decoding dependencies. However, they do not need to be included into individual NAL units (same as WPP in this regard); hence tiles cannot be used for MTU size matching. Each tile can be processed by one processor/core, and the inter-processor/inter-core communication required for in-picture prediction between processing units decoding neighboring tiles is limited to conveying the shared slice header in cases a slice is spanning more than one tile, and loop filtering related sharing of reconstructed samples and metadata. When more than one tile or WPP segment is included in a slice, the entry point byte offset for each tile or WPP segment other than the first one in the slice is signaled in the slice header.

For simplicity, restrictions on the application of the four different picture partitioning schemes have been specified in HEVC. A given coded video sequence cannot include both tiles and wavefronts for most of the profiles specified in HEVC. For each slice and tile, either or both of the following conditions must be fulfilled: 1) all coded treeblocks in a slice belong to the same tile; 2) all coded treeblocks in a tile belong to the same slice. Finally, a wavefront segment contains exactly one CTB row, and when WPP is in use, if a slice starts within a CTB row, it must end in the same CTB row.

With a recent amendment to HEVC, HEVC specifies three Motion-Constrained Tile Sets (MCTS)-related Supplemental Enhancement Information (SEI) messages, namely temporal MCTSs SEI message, MCTSs extraction information set SEI message, and MCTSs extraction information nesting SEI message.

The temporal MCTSs SEI message indicates existence of MCTSs in the bitstream and signals the MCTSs. For each MCTS, motion vectors are restricted to point to full-sample locations inside the MCTS and to fractional-sample locations that require only full-sample locations inside the MCTS for interpolation, and the usage of motion vector candidates for temporal motion vector prediction derived from blocks outside the MCTS is disallowed. This way, each MCTS may be independently decoded without the existence of tiles not included in the MCTS.

The MCTSs extraction information sets SEI message provides supplemental information that can be used in the MCTS sub-bitstream extraction (specified as part of the semantics of the SEI message) to generate a conforming bitstream for an MCTS set. The information consists of a number of extraction information sets, each defining a number of MCTS sets and containing Raw Byte Sequence Payload (RBSP) bytes of the replacement VPSs, SPSs, and PPSs to be used during the MCTS sub-bitstream extraction process. When extracting a sub-bitstream according to the MCTS sub-bitstream extraction process, parameter sets (VPSs, SPSs, and PPSs) need to be rewritten or replaced, slice headers need to be slightly updated because one or all of the slice address related syntax elements (including first_slice_segment_in_pic_flag and slice_segment_address) typically would need to have different values.

3.2. Partitioning of Pictures in VVC

In VVC, A picture is divided into one or more tile rows and one or more tile columns. A tile is a sequence of CTUs that covers a rectangular region of a picture. The CTUs in a tile are scanned in raster scan order within that tile.

A slice consists of an integer number of complete tiles or an integer number of consecutive complete coding tree unit (CTU) rows within a tile of a picture.

Two modes of slices are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

A subpicture contains one or more slices that collectively cover a rectangular region of a picture.

Figure 1:
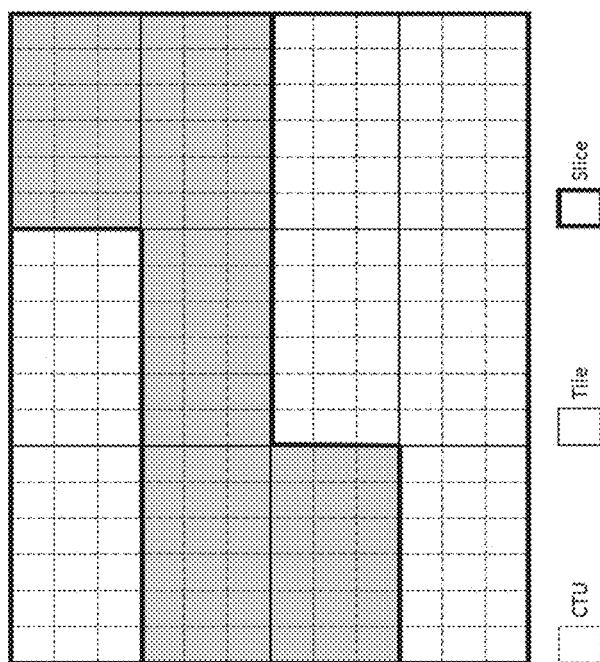
FIG. 1 shows an example of raster-scan slice partitioning of a picture, where the picture is divided into 12 tiles and 3 raster-scan slices.

FIG. 1 shows an example of raster-scan slice partitioning of a picture, where the picture is divided into 12 tiles and 3 raster-scan slices.

FIG. 2 shows an example of rectangular slice partitioning of a picture, where the picture is divided into 24 tiles (6 tile columns and 4 tile rows) and 9 rectangular slices.

Figure 3:
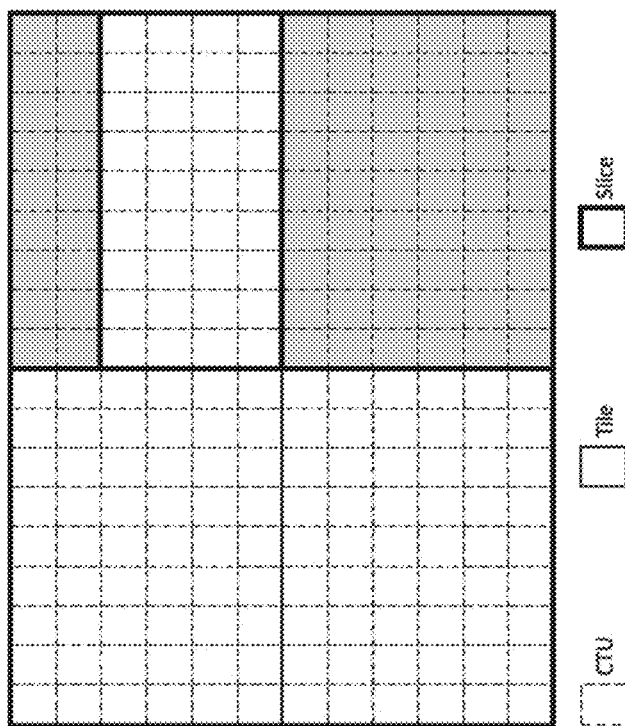
FIG. 3 shows an example of a picture partitioned into tiles and rectangular slices, where the picture is divided into 4 tiles (2 tile columns and 2 tile rows) and 4 rectangular slices.

FIG. 3 shows an example of a picture partitioned into tiles and rectangular slices, where the picture is divided into 4 tiles (2 tile columns and 2 tile rows) and 4 rectangular slices.

Figure 4:
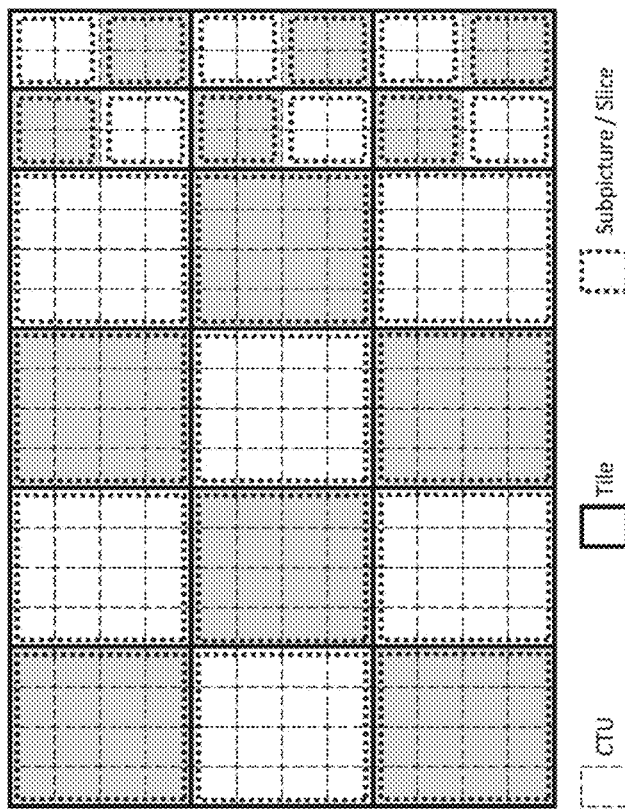
FIG. 4 shows a picture that is partitioned into 15 tiles, 24 slices and 24 subpictures.

FIG. 4 shows an example of subpicture partitioning of a picture, where a picture is partitioned into 18 tiles, 12 on the left-hand side each covering one slice of 4 by 4 CTUs and 6 tiles on the right-hand side each covering 2 vertically-stacked slices of 2 by 2 CTUs, altogether resulting in 24 slices and 24 subpictures of varying dimensions (each slice is a subpicture).

3.3. Picture Resolution Change within a Sequence

In AVC and HEVC, the spatial resolution of pictures cannot change unless a new sequence using a new SPS starts, with an IRAP picture. VVC enables picture resolution change within a sequence at a position without encoding an IRAP picture, which is always intra-coded. This feature is sometimes referred to as reference picture resampling (RPR), as the feature needs resampling of a reference picture used for inter prediction when that reference picture has a different resolution than the current picture being decoded.

The scaling ratio is restricted to be larger than or equal to ½ (2 times downsampling from the reference picture to the current picture), and less than or equal to 8 (8 times upsampling). Three sets of resampling filters with different frequency cutoffs are specified to handle various scaling ratios between a reference picture and the current picture. The three sets of resampling filters are applied respectively for the scaling ratio ranging from ½ to 1/1.75, from 1/1.75 to 1/1.25, and from 1/1.25 to 8. Each set of resampling filters has 16 phases for luma and 32 phases for chroma which is same to the case of motion compensation interpolation filters. Actually the normal MC interpolation process is a special case of the resampling process with scaling ratio ranging from 1/1.25 to 8. The horizontal and vertical scaling ratios are derived based on picture width and height, and the left, right, top and bottom scaling offsets specified for the reference picture and the current picture.

Other aspects of the VVC design for support of this feature that are different from HEVC include: i) The picture resolution and the corresponding conformance window are signaled in the PPS instead of in the SPS, while in the SPS the maximum picture resolution is signaled. ii) For a single-layer bitstream, each picture store (a slot in the decoded picture buffer (DPB) for storage of one decoded picture) occupies the buffer size as required for storing a decoded picture having the maximum picture resolution.

3.4. Scalable Video Coding (SVC) in General and in VVC

Scalable video coding (SVC, sometimes also just referred to as scalability in video coding) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the Multiview or 3D extension of the HEVC standard, there may be multiple views, and information of one view may be utilized to code (e.g., encode or decode) the information of another view (e.g., motion estimation, motion vector prediction and/or other redundancies).

In SVC, the parameters used by the encoder or the decoder are grouped into parameter sets based on the coding level (e.g., video-level, sequence-level, picture-level, slice level, etc.) in which they may be utilized. For example, parameters that may be utilized by one or more coded video sequences of different layers in the bitstream may be included in a video parameter set (VPS), and parameters that are utilized by one or more pictures in a coded video sequence may be included in a sequence parameter set (SPS). Similarly, parameters that are utilized by one or more slices in a picture may be included in a picture parameter set (PPS), and other parameters that are specific to a single slice may be included in a slice header. Similarly, the indication of which parameter set(s) a particular layer is using at a given time may be provided at various coding levels.

Thanks to the support of reference picture resampling (RPR) in VVC, support of a bitstream containing multiple layers, e.g., two layers with standard definition (SD) and high definition (HD) resolutions in VVC can be designed without the need any additional signal-processing-level coding tool, as upsampling needed for spatial scalability support can just use the RPR upsampling filter. Nevertheless, high-level syntax changes (compared to not supporting scalability) are needed for scalability support. Scalability support is specified in VVC version 1. Different from the scalability supports in any earlier video coding standards, including in extensions of AVC and HEVC, the design of VVC scalability has been made friendly to single-layer decoder designs as much as possible. The decoding capability for multi-layer bitstreams are specified in a manner as if there were only a single layer in the bitstream. E.g., the decoding capability, such as DPB size, is specified in a manner that is independent of the number of layers in the bitstream to be decoded. Basically, a decoder designed for single-layer bitstreams does not need much change to be able to decode multi-layer bitstreams. Compared to the designs of multi-layer extensions of AVC and HEVC, the HLS aspects have been significantly simplified at the sacrifice of some flexibilities. For example, an IRAP Access Unit (AU) is required to contain a picture for each of the layers present in the CVS.

3.5. Viewport-Dependent 360° Video Streaming Based on Subpictures

In streaming of 360o video, a.k.a. omnidirectional video, at any particular moment only a subset (e.g., the current viewport) of the entire omnidirectional video sphere would be rendered to the user, while the user can turn his/her head anytime to change the viewing orientation and consequently the current viewport. While it is desirable to have at least some lower-quality representation of the area not covered by the current viewport available at the client and ready to be rendered to the user just in case the user suddenly changes his/her viewing orientation to anywhere on the sphere, a high-quality representation of the omnidirectional video is only needed for the current viewport that is being rendered to the use right now. Splitting the high-quality representation of the entire omnidirectional video into subpictures at an appropriate granularity enables such an optimization. Using VVC, the two representations can be encoded as two layers that are independent from each other.

Figure 11:
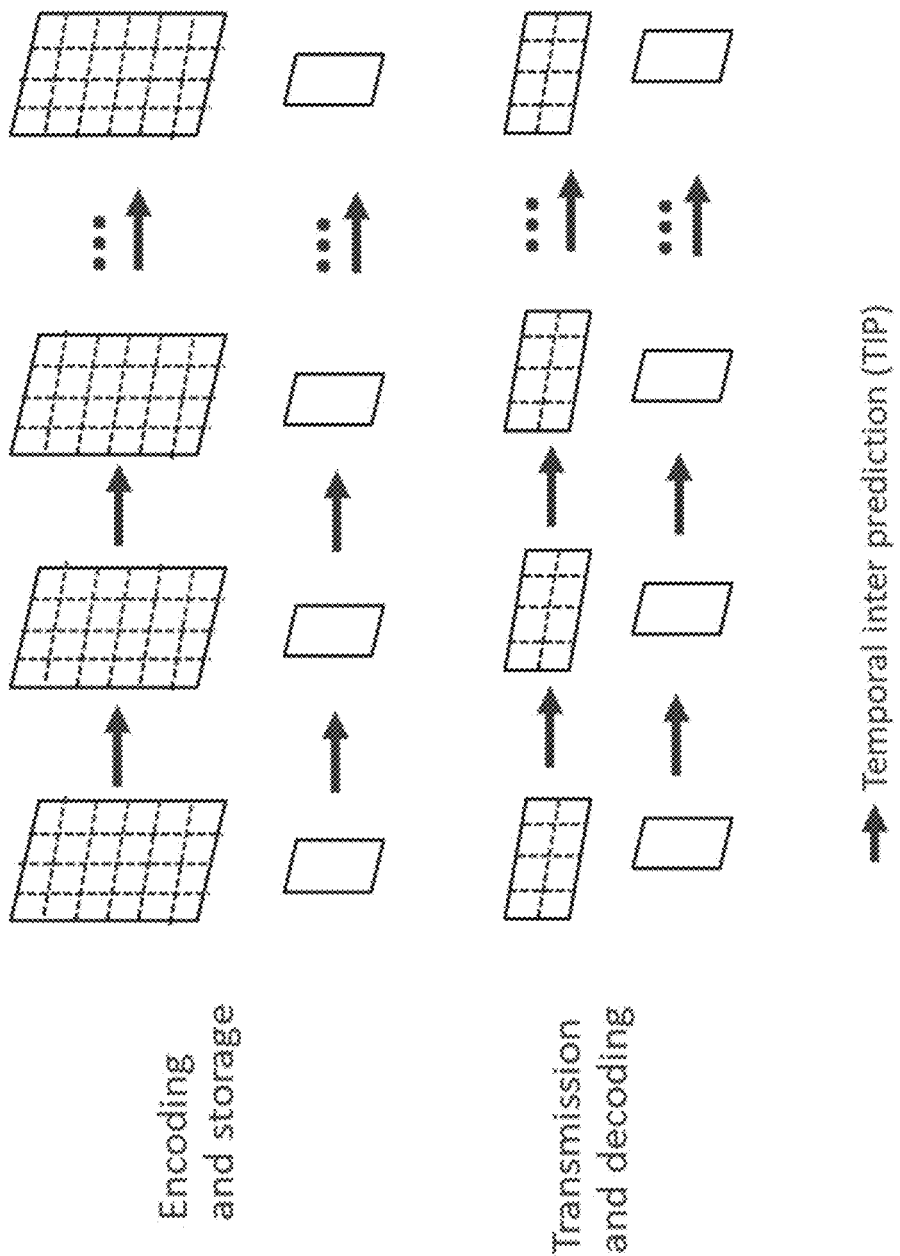
FIG. 11 shows an example of a typical subpicture-based viewport-dependent 360o video coding scheme.

A typical subpicture-based viewport-dependent 360o video delivery scheme is shown in FIG. 11 wherein a higher-resolution representation of the full video consists of subpictures, while a lower-resolution representation of the full video does not use subpictures and can be coded with less frequent random access points than the higher-resolution representation. The client receives the full video in the lower-resolution and for the higher-resolution video it only receives and decode the subpictures that cover the current viewport.

3.6. Parameter Sets

AVC, HEVC, and VVC specify parameter sets. The types of parameter sets include sequence parameter set (SPS), picture parameter set (PPS), adaptation parameter set (APS), and video parameter set (VPS). SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signaling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

4. Technical Problems Solved by Disclosed Technical Solutions

Figure 12:
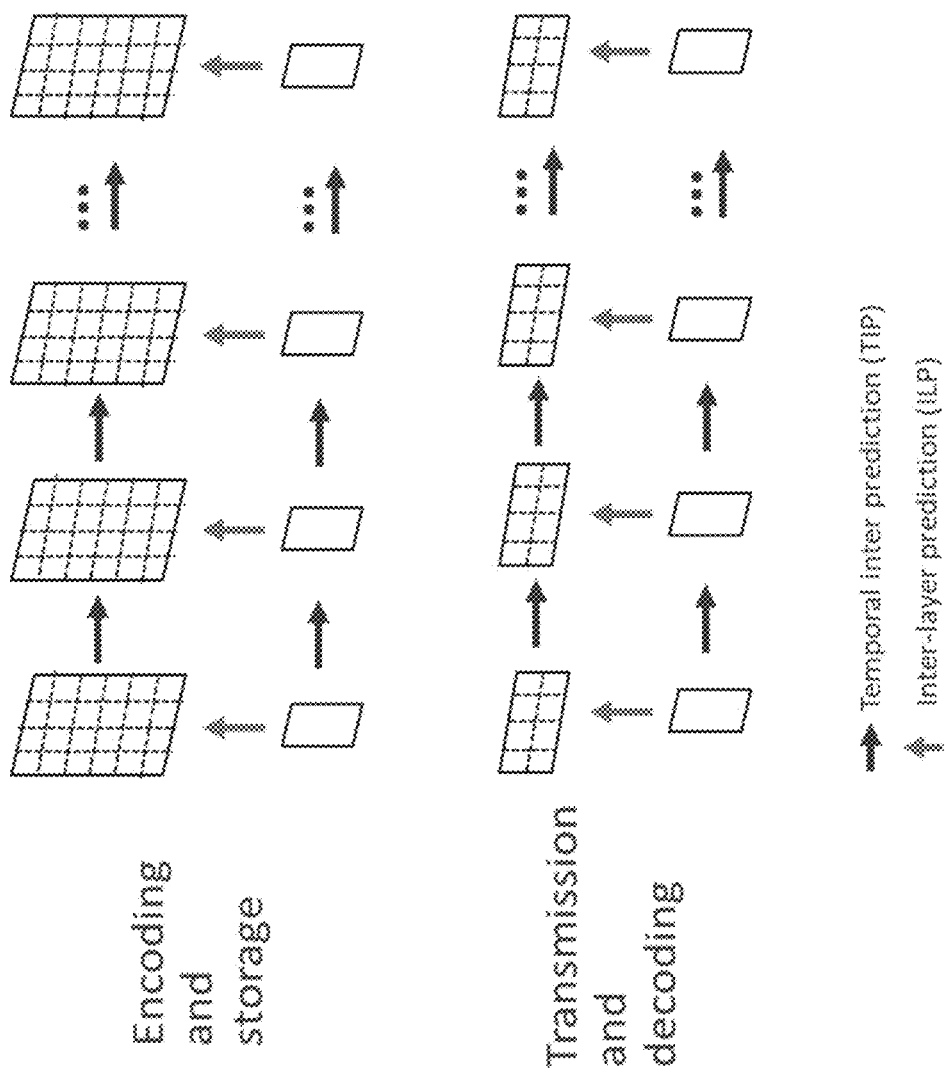
FIG. 12 shows a viewport-dependent 360o video coding scheme based on subpictures and spatial scalability.

The existing design in the latest VVC text has the following problems:
1) The current VVC design supports the typical coding scheme for 360° video as shown in FIG. 11. However, although scalability is supported in the current VVC design, an improved 360° video coding scheme as shown in FIG. 12 is not supported. The only difference compared to the approach shown in FIG. 11 is that inter-layer prediction (ILP) is applied for the approach shown in FIG. 12.

The following two places in the VVC draft disallows the combined use of subpicures and spatial scalability:
   a. The spatial scalability design in VVC relies on the RPR feature. However, the combination of RPR and subpictures is currently disallowed by the following semantics constraint:
      When res_change_in_clvs_allowed_flag is equal to 1, the value of subpic_info_present_flag shall be equal to 0.
   Consequently, the improved coding scheme is disallowed, because for the SPS referred to by the higher layer, the above constrain disallows setting subpic_info_present_flag to 1 (to use multiple subpictures per picture) and at the same time set res_change_in_clvs_allowed_flag to 1 (to enable RPR, which is needed for spatial scalability with ILP).
   b. The current VVC draft has the following constraint on the combination of subpictures and scalability:
      When subpic_treated_as_pic_flag[i] is equal to 1, it is a requirement of bitstream conformance that all of the following conditions are true for each output layer and its reference layers in an OLS that includes the layer containing the i-th subpicture as an output layer:
         All pictures in the output layer and its reference layers shall have the same value of pic_width_in_luma_samples and the same value of pic_height_in_luma_samples.
         All the SPSs referred to by the output layer and its reference layers shall have the same value of sps_num_subpics_minus1 and shall have the same values of subpic_ctu_top_left_x[j], subpic_ctu_top_left_y[j], subpic_width_minus1[j], subpic_height_minus1[j], and loop_filter_across_subpic_enabled_flag[j], respectively, for each value of j in the range of 0 to sps_num_subpics_minus1, inclusive.
         All pictures in each access unit in the output layer and its reference layers shall have the same value of SubpicIdVal[j] for each value of j in the range of 0 to sps_num_subpics_minus1, inclusive.
      This above constraint basically disallows any other combination of subpictures and scalability with ILP than the restricted combination of subpictures with SNR scalability, wherein layers within each dependency tree must have the same spatial resolution as well as the same subpicture layout.
2) When subpic_treated_as_pic_flag[i] is equal to 1, the subpicture boundaries of the i-th subpicture would be treated as picture boundaries in motion compensation. Such treating is realized in the VVC draft text by applying certain clipping operations in the decoding processes related to motion compensation. However, for the improved coding scheme shown in FIG. 12 since the lower layer is fully available to the decoder, not just the area corresponding to the i-th subpicture, such clipping does not need to be applied in this case, to avoid unnecessary coding efficiency loss.
3) Without considering the support of the improved coding scheme shown in FIG. 12, the above existing constraint on the combination of subpictures and scalability with ILP (the description is included in the description of problem 1b) has the following issues:
   a. The constraint should also apply when the layer containing the i-th subpicture is not an output layer of an Output Layer Set (OLS). The entire constraint should be specified in a manner that does not taking into account of whether a layer is an output layer of an OLS.
   b. The requirement for the value of subpic_treated_as_pic_flag[i] to be aligned across layers should be included, otherwise extraction of the subpicture sequence with the same index across the layers won't be possible.
   c. The requirement for the value of loop_filter_across_subpic_enabled_flag[i] to be aligned across layers should be excluded, as regardless of the value of this flag, as long as the subpic_treated_as_pic_flag[i] is equal to 1 the subpicture sequence is extractable. Setting of the value of loop_filter_across_subpic_enabled_flag[i] should be left for the encoder to decide for trading-off the quality of single extractable subpicture sequences vs the quality of sets of extractable subpicture sequences, just as why the two flags are signaled independently from each other.
   d. The entire constraint should only apply when sps_num_subpics_minus1 is greater than 0, to avoid all cases of one subpicture per subpicture being covered by the constraint, unintentionally.
   e. The temporal scope, e.g., the set of AUs, in which the constraint applies needs to be clearly specified.
   f. The requirement for the value of each of the scaling window parameters scaling_win_left_offset, scaling_win_right_offset, scaling_win_top_offset, and scaling_win_bottom_offset to be aligned across layers should be included, to make sure RPR of LTRPs is not needed when there are multiple subpictures per picture.
4) Currently, the collocated picture for a current picture may be a long-term reference picture (LTRP) in the same layer as the current picture and may also be an inter-layer reference picture (ILRP), e.g., a reference picture in a different layer as the current picture. However, in either case, picture order count (POC) based scaling of motion vectors won't be applied, thus the coding performance due to allowing this is expected to be very low. Consequently, it'd be better to disallow the collocated picture for a current picture to be an LTRP or ILRP.
5) Currently, it is allowed for pictures with the same spatial resolution in a CLVS to have different scaling windows. However, that should be disallowed, as otherwise, the SPS flag for RPR and the general constraint flag for RPR won't be able to be used to fully disable the RPR tools.

5. A Listing of Technical Solutions and Embodiments

To solve the above problems, and others, methods as summarized below are disclosed. The items should be considered as examples to explain the general concepts and should not be interpreted in a narrow way. Furthermore, these items can be applied individually or combined in any manner.

1) To solve problem 1a, instead of having just one SPS flag (e.g., res_change_in_clvs_allowed_flag as in the current VVC draft) for controlling RPR, multiple (such as two) SPS flags may be specified and/or signaled for this purpose.
   a. For example, the first flag (e.g., ref_pic_resampling_enabled_flag) specifies whether the use of RPR may be needed for decoding of one or more pictures, while the second flag (e.g., res_change_in_clvs_allowed_flag) specifies whether the picture resolution is allowed to change within the CLVS.
   b. Alternatively, furthermore, the second flag is only signaled when the first flag specifies that the use of RPR may be needed for decoding of one or more pictures. Furthermore, when not signaled, the value of the second flag is inferred to be the value that specifies that the picture resolution is not allowed to change within the CLVS.
      i. Alternatively, the two flags are signaled independent of each other.
   c. Alternatively, furthermore, one more general constraint flag is added, such that there is one general constraint flag for each of the first and second flags.
   d. Furthermore, the combination of multiple subpictures per picture with res_change_in_clvs_allowed_flag equal to 1 is disallowed, but the combination of multiple subpictures per picture with ref_pic_resampling_enabled_flag equal to 1 is allowed.
   e. Furthermore, the constraint of the value of scaling_window_explicit_signalling_flag based on the value of res_change_in_clvs_allowed_flag is changed to be based on the value of ref_pic_resampling_enabled_flag, as follows: When ref_pic_resampling_enabled_flag is equal to 0, the value of scaling_window_explicit_signalling_flag shall be equal to 0.
   f. Alternatively, either one or all of the multiple (such as two) flags may be signaled in the VPS instead of in the SPS.
      i. In one example, either one or all of the multiple (such as two) flags in the VPS apply to all layers specified by the VPS.
      ii. In another example, either one or all of the multiple (such as two) flags in the VPS can each have multiple instances signaled in the VPS and each instance applies to all layers in one dependency tree.
   g. In one example, each of the multiple flags are coded as an unsigned integer using 1 bits u(1).
   h. Alternatively, one syntax element may be signaled with a non-binary value, e.g., in SPS/VPS to specify the usage of RPR in decoding process and allowance of picture resolution change within a CLVS.
      i. In one example, when the value of the syntax element is equal to 0, it specifies that use of RPR is not needed for decoding of one or more pictures.
      ii. In one example, when the value of the syntax element is equal to 1, it specifies that use of RPR may be needed for decoding of one or more pictures while the picture resolution is disallowed to change within the CLVS.
      iii. In one example, when the value of the syntax element is equal to 2, it specifies that use of RPR may be needed for decoding of one or more pictures while the picture resolution is allowed to change within the CLVS.
      iv. Alternatively, furthermore, how to signal the syntax element may depend on whether inter-layer prediction is allowed.
      v. In one example, the syntax element is coded with ue(v), indicating an unsigned integer 0-th order Exp-Golomb-coded syntax element with the left bit first.
      vi. In another example, the syntax element is coded as an unsigned integer using N bits u(N), e.g., with N equal to 2.
2) Alternatively, or in addition to item 1 for solving problem 1a, still to have just one flag, e.g., res_change_in_clvs_allowed_flag, but the semantics may be changed such that regardless of the value of the flag, resampling of an inter-layer reference picture is allowed.
   a. In one example, the semantics may be changed to be as follows: res_change_in_clvs_allowed_flag equal to 1 specifies that the picture spatial resolution may change within a CLVS referring to the SPS and when decoding a current picture in the CLVS, resampling of a reference picture in the same layer as the current picture may be needed. res_change_in_clvs_allowed_flag equal to 0 specifies that the picture spatial resolution does not change within any CLVS referring to the SPS and when decoding any current picture in the CLVS, resampling of a reference picture in the same layer as the current picture is not needed.
   b. With this change, then even when res_change_in_clvs_allowed_flag is equal to 0, the decoding of a subpicture/picture can still use RPR for inter-layer reference pictures (ILRPs).
3) To solve problem 1b, the constraint on combination of subpictures and scalability with ILP is updated such that the constraint only imposes cross-layer alignment restrictions on the current layer and all the higher layers that depend on the current layer, while not on the higher layers that do not depend on the current layer or on the lower layers.
   a. Alternatively, the constraint is updated to only impose cross-layer alignment restrictions on the current layer and all the layers that are higher than the current layer.
   b. Alternatively, the constraint is updated to only impose cross-layer alignment restrictions on the current layer and all the higher layers in each OLS containing the current layer.
   c. Alternatively, the constraint is updated to only impose cross-layer alignment restrictions on the current layer and all the lower layers that are the current layer's reference layer.

d. Alternatively, the constraint is updated to only impose cross-layer alignment restrictions on the current layer and all layers that are lower than the current layer.
e. Alternatively, the constraint is updated to only impose cross-layer alignment restrictions on the current layer and all the lower layers in each OLS containing the current layer.
f. Alternatively, the constraint is updated to only impose cross-layer alignment restrictions on all layers that are lower than the highest layer.
g. Alternatively, the constraint is updated to only impose cross-layer alignment restrictions on all layers that are higher than the lowest layer.

4) To solve problem 2, in one or more of the decoding processes involving the clipping operations in the inter prediction related processes for handling of subpicture boundaries in motion compensation/motion prediction as picture boundaries (e.g., in clauses 8.5.2.11 Derivation process for temporal luma motion vector prediction, 8.5.3.2.2 Luma sample bilinear interpolation process, 8.5.5.3 Derivation process for subblock-based temporal merging candidates, 8.5.5.4 Derivation process for subblock-based temporal merging base motion data, 8.5.5.6 Derivation process for constructed affine control point motion vector merging candidates, 8.5.6.3.2 Luma sample interpolation filtering process, 8.5.6.3.3 Luma integer sample fetching process, and 8.5.6.3.4 Chroma sample interpolation process), the following changes are applied:
  a. In one example, the processes are changed such that the clipping operations are applied if subpic_treated_as_pic_flag[CurrSubpicIdx] is equal to 1 and sps_num_subpics_minus1 for the reference picture refPicLX is greater than 0, and not applied otherwise.
    i. Alternatively, when the collocated picture for a picture is disallowed to be an ILRP, only the processes wherein the reference picture refPicLX is not the collocated picture are changed as described above, and the processes wherein the reference picture refPicLX is the collocated picture is not changed.
  b. In one example, the processes are changed such that the clipping operations are applied if subpic_treated_as_pic_flag[CurrSubpicIdx] is equal to 1 and the value of nal_unit_type of the current slice is not equal to Instantaneous Decoding Refresh (IDR) with Random Access Decodable Leading (RADL) (IDR_W_RADL), IDR no leading pictures (IDR_N_LP), or clean random access (CRA) NAL unit type (NUT) (CRA NUT), and not applied otherwise. At the same time, ILP is allowed for coding of IRAP pictures only.
  c. In one example, no changes to these decoding processes are made, e.g., the clipping operations are applied if subpic_treated_as_pic_flag[CurrSubpicIdx] is equal to 1 and not applied otherwise, same as in the current VVC text.

5) To solve problem 3a, the constraint on the combination of subpictures and scalability with ILP is updated such that the constraint imposes cross-layer alignment restrictions on all layers in each dependency tree. A dependency tree contains a particular layer, all layers that have the particular layer as a reference layer, and all reference layers of the particular layer), independent of whether any of the layers is an output layer of an OLS.

6) To solve problem 3b, the constraint on the combination of subpictures and scalability with ILP is updated such that the constraint imposes a cross-layer alignment restriction on the value of subpic_treated_as_pic_flag[i].

7) To solve problem 3c, the constraint on the combination of subpictures and scalability with ILP is updated such that the constraint does not impose a cross-layer alignment restriction on the value of loop_filter_across_subpic_enabled_flag[i].

8) To solve problem 3d, the constraint on the combination of subpictures and scalability with ILP is updated such that the constraint does not apply when sps_num_subpics_minus1 is equal to 0.
  a. Alternatively, the constraint is updated such that the constraint does not apply when subpic_info_present_flag is equal to 0.

9) To solve problem 3e, the constraint on the combination of subpictures and scalability with ILP is updated such that the constraint imposes cross-layer alignment restrictions on pictures in certain target set of AUs.
  a. In one example, for each CLVS of a current layer referring to the SPS, let the target set of AUs targetAuSet be all the AUs starting from the AU containing the first picture of the CLVS in decoding order, to the AU containing the last picture of the CLVS in decoding order, inclusive.

10) To solve problem 3f, the constraint on the combination of subpictures and scalability with ILP is updated such that the constraint imposes a cross-layer alignment restriction for the value of each of the scaling window parameters scaling_win_left_offset, scaling_win_right_offset, scaling_win top offset, and scaling_win_bottom_offset.

11) To solve problem 4, it is constrained that the collocated picture for a current picture shall not be a long-term reference picture (LTRP).
  a. Alternatively, it is constrained that the collocated picture for a current picture shall not be an inter-layer reference picture (ILRP).
  b. Alternatively, it is constrained that the collocated picture for a current picture shall not be an LTRP or ILRP.
  c. Alternatively, instead, if the collocated picture for a current picture is an LTRP or ILRP, no scaling is applied to get the motion vector pointing to the collocated picture.

12) To solve problem 5, it is constrained that the value of each of scaling_win_left_offset, scaling_win_right_offset, scaling_win_top_offset, and scaling_win_bottom_offset shall be the same for any two pictures within the same CLVS having the same values of pic_width_in_luma_samples and pic_height_in_luma_samples, respectively.
  a. Alternatively, replace "within the same CLVS" above with "within the same CVS".
  b. Alternatively, the constraint is specified as follows: Let ppsA and ppsB be any two PPSs referring to the same SPS. It is a requirement of bitstream conformance that, when ppsA and ppsB have the same the values of pic_width_in_luma_samples and pic_height_in_luma_samples, respectively, ppsA and ppsB shall have the same values of scaling_win_left_offset, scaling_win_right_offset, scaling_win_top_offset, and scaling_win_bottom_offset, respectively.
  c. Alternatively, the constraint is specified as follows: The value of each of scaling_win_left_offset, scaling_win_right offset, scaling_win_top_offset, and scaling_win_bottom_offset shall be the same for any two pictures within the same CVS and satisfying all of the following conditions:
    i. The two pictures have the same values of pic_width_in_luma_samples and pic_height_in_luma_samples, respectively.
    ii. The two pictures belong to the same layer or two layers that one layer is a reference layer of the other layer.
13) It is proposed that when the picture resolution/scaling window is different for a current picture and other picture in the same access unit, ILP is only allowed when the current picture is an IRAP picture.
14) In this document, the picture resolution may refer to the width and/or height of a picture, or it may refer to the width and/or height and/or top-left corner position of a scaling window/or conformance window of the picture.
15) In this document, RPR is not used may mean that the resolution of any reference pictures of the current picture is the same to that of the current picture.

6. Embodiments

Below are some example embodiments for some of the aspects summarized above in Section 5, which can be applied to the VVC specification. Most relevant parts that have been added or modified are underlined in boldface italics, and some of the deleted parts are indicated using [[ ]].

6.1. First Embodiment

This embodiment is for items 1, 1.a, 1.b, 1.c, 1.d, 3, 4.a.i, 5, 6, 7, 8, 9, 9.a, 10, 11, and 12b.

7.3.2.3 Sequence Parameter Set Syntax

|  | Descriptor |
|---|---|
| seq_parameter_set_rbsp( ) { | |
| ... | |
| *__ref pic resampling enabled flag__* | *__u(1)__* |
| *__if(ref pic resampling enabled flag)__* | |
|    res_change_in_clvs_allowed_flag | u(1) |
|    pic_width_max_in_luma_samples | ue(v) |
|    pic_height_max_in_luma_samples | ue(v) |
| ... | |
| } | |

7.4.3.3 Sequence Parameter Set RBSP Semantics ref pic resampling enabled flag equal to 1 specifies that one or more slices of pictures in the CLVS may refer to a reference picture with a different spatial resolution in an active entry of a reference picture list. ref pic resampling enabled flag equal to 0 specifies that no slice of pictures in the CLVS refers to a reference picture with a different spatial resolution in an active entry of a reference picture list.
  NOTE 2—When ref pic resampling enabled flag is equal to 1, for a current picture the reference picture with a different spatial resolution may either belong to the same layer or a different layer than the layer containing the current picture.

res_change_in_clvs_allowed_flag equal to 1 specifies that the picture spatial resolution may change within a CLVS referring to the SPS. res_change_in_clvs_allowed_flag equal to 0 specifies that the picture spatial resolution does not change within any CLVS referring to the SPS. When not present, the value of res change in clvs allowed flag is inferred to be equal to 0.

subpic_treated_as_pic_flag[i] equal to 1 specifies that the i-th subpicture of each coded picture in the CLVS is treated as a picture in the decoding process excluding in-loop filtering operations. subpic_treated_as_pic_flag[i] equal to 0 specifies that the i-th subpicture of each coded picture in the CLVS is not treated as a picture in the decoding process excluding in-loop filtering operations. When not present, the value of subpic_treated_as_pic_flag[i] is inferred to be equal to sps_independent_subpics_flag.

When sps_num_subpics_minus1 is greater than 0 and subpic_treated_as_pic_flag[i] is equal to 1, for each CLVS of a current layer referring to the SPS, let targetAuSet be all the AUs starting from the AU containing the first picture of the CLVS in decoding order, to the AU containing the last picture of the CLVS in decoding order, inclusive, it is a requirement of bitstream conformance that all of the following conditions are true for the targetLayerSet that consists of the current layer and all the layers that have the current layer as a reference layer:
  All pictures of the AUs in targetAuSet and the layers in targetLayerSet shall have the same value of pic_width_in_luma samples and the same value of pic_height_in_luma_samples.
  All pictures of the AUs in targetAuSet and the layers in targetLayerSet shall have the same value of each of scaling win left offset, scaling win right offset, scaling win top offset, and scaling win bottom offset.
  All the SPSs referred to by the layers in targetLayerSet shall have the same value of sps_num_subpics_minus1 and shall have the same values of subpic_ctu_top_left_x[j], subpic_ctu_top_left_y[j], subpic_width_minus1[j], subpic_height_minus1[j], and subpic treated as pic flag[j][[loop_filter_across_subpic_enabled_flag[j],]] respectively, for each value of j in the range of 0 to sps_num_subpics_minus1, inclusive.
  All pictures of the AUs in targetAuSet and the layers in targetLayerSet shall have the same value of SubpicIdVal[j] for each value of j in the range of 0 to sps_num_subpics_minus1, inclusive.

7.4.3.4 Picture Parameter Set RBSP Semantics scaling_window_explicit_signalling_flag equal to 1 specifies that the scaling window offset parameters are present in the PPS. scaling_window_explicit_signalling_flag equal to 0 specifies that the scaling window offset parameters are not present in the PPS. When ref pic resampling enabled flag [[res_change_in_clvs_allowed_flag]] is equal to 0, the value of scaling_window_explicit_signalling_flag shall be equal to 0.

scaling_win_left_offset, scaling_win_right_offset, scaling_win_top_offset, and scaling_win_bottom_offset specify the offsets that are applied to the picture size for scaling ratio calculation. When not present, the values of scaling_win_left_offset, scaling_win_right_offset, scaling_win_top_offset, and scaling_win_bottom_offset are inferred to be equal to pps_conf_win_left_offset, pps_conf_win_right_offset, pps_conf_win_top_offset, and pps_conf_win_bottom_offset, respectively.

The value of SubWidthC*(scaling_win_left_offset+scaling_win_right_offset) shall be less than pic_width_in_luma_samples, and the value of SubHeightC*(scaling_win_top_offset+scaling_win_bottom_offset) shall be less than pic_height_in_luma_samples.

Let ppsA and ppsB be any two PPSs referring to the same SPS. It is a requirement of bitstream conformance that, when ppsA and ppsB have the same the values of pie width in luma samples and pie height in luma samples, respectively, ppsA and ppsB shall have the same values of scaling win left offset, scaling win right offset, scaling win top offset, and scaling win bottom offset, respectively.

The variables PicOutputWidthL and PicOutputHeightL are derived as follows:
PicOutputWidthL=pic_width_in_luma_samples−SubWidthC*(scaling_win_right_offset+scaling_win_left_offset) (78)
PicOutputHeightL=pic_height_in_luma_samples−SubWidthC*(scaling_win_bottom_offset+scaling_win_top_offset) (79)

Let refPicOutputWidthL and refPicOutputHeightL be the PicOutputWidthL and PicOutputHeightL, respectively, of a reference picture of a current picture referring to this PPS. It is a requirement of bitstream conformance that all of the following conditions are satisfied:
PicOutputWidthL*2 shall be greater than or equal to refPicWidthInLumaSamples.
PicOutputHeightL*2 shall be greater than or equal to refPicHeightInLumaSamples.
PicOutputWidthL shall be less than or equal to refPicWidthInLumaSamples*8.
PicOutputHeightL shall be less than or equal to refPicHeightInLumaSamples*8.
PicOutputWidthL*pic_width_max_in_luma_samples shall be greater than or equal to refPicOutputWidthL*(pic_width_in_luma_samples-Max(8, MinCbSizeY)).
PicOutputHeightL*pic_height_max_in_luma_samples shall be greater than or equal to refPicOutputHeightL*(pic_height_in_luma_samples-Max(8, MinCbSizeY)).

7.3.3.2 General Constraint Information Syntax

| | Descriptor |
|---|---|
| general_constraint_info( ) { | |
| ... | |
|   *no_ref_pic_resampling_constraint_flag* | *u(1)* |
|   no_res_change_in_clvs_constraint_flag | u(1) |
| ... | |
| } | |

7.4.4.2 General Constraint Information Semantics no ref pic resampling constraint flag equal to 1 specifies that ref pie resampling enabled flag shall be equal to 0. no ref pie resampling constraint flag equal to 0 does not impose such a constraint.

no_res_change_in_clvs_constraint_flag equal to 1 specifies that res_change_in_clvs_allowed_flag shall be equal to 0. no_res_change_in_clvs_constraint_flag equal to 0 does not impose such a constraint.

7.4.8.1 General Slice Header Semantics slice_collocated_from_10_flag equal to 1 specifies that the collocated picture used for temporal motion vector prediction is derived from reference picture list 0. slice_collocated_from_10_flag equal to 0 specifies that the collocated picture used for temporal motion vector prediction is derived from reference picture list 1.

When slice_type is equal to B or P, ph_temporal_mvp_enabled_flag is equal to 1, and slice_collocated_from_10_flag is not present, the following applies:
  If rpl_info_in_ph flag is equal to 1, slice_collocated_from_10_flag is inferred to be equal to ph_collocated_from_10_flag.
  Otherwise (rpl_info_in_ph_flag is equal to 0 and slice_type is equal to P), the value of slice_collocated_from_10_flag is inferred to be equal to 1.

slice_collocated_ref_idx specifies the reference index of the collocated picture used for temporal motion vector prediction.

When slice_type is equal to P or when slice_type is equal to B and slice_collocated_from_10_flag is equal to 1, slice_collocated_ref_idx refers to an entry in reference picture list 0, and the value of slice_collocated_ref_idx shall be in the range of 0 to NumRefIdxActive[0]-1, inclusive.

When slice_type is equal to B and slice_collocated_from_10_flag is equal to 0, slice_collocated_ref_idx refers to an entry in reference picture list 1, and the value of slice_collocated_ref_idx shall be in the range of 0 to NumRefIdxActive[1]-1, inclusive.

When slice_collocated_ref_idx is not present, the following applies:
  If rpl_info_in_ph_flag is equal to 1, the value of slice_collocated_ref_idx is inferred to be equal to ph_collocated_ref_idx.
  Otherwise (rpl_info_in_ph_flag is equal to 0), the value of slice_collocated_ref_idx is inferred to be equal to 0.

It is a requirement of bitstream conformance that the picture referred to by slice_collocated_ref_idx shall be the same for all slices of a coded picture and shall not be a long-term reference picture.

It is a requirement of bitstream conformance that the values of pic_width_in_luma_samples and pic_height_in_luma_samples of the reference picture referred to by slice_collocated_ref_idx shall be equal to the values of pic_width_in_luma_samples and pic_height_in_luma_samples, respectively, of the current picture, and RprConstraintsActive[slice_collocated_from 10 flag? 0: 1][slice_collocated_ref_idx] shall be equal to 0.

8.5.3.2.2 Luma Sample Bilinear Interpolation Process

The luma locations in full-sample units $(xInt_i, yInt_i)$ are derived as follows for i=0..1:
  If subpic_treated_as_pic_flag[CurrSubpicIdx] is equal to 1 and sps_num_subpics_minus1 for the reference picture refPicLX is greater than 0, the following applies:
    $xInt_i$=Clip3(SubpicLeftBoundaryPos, SubpicRightBoundaryPos, $xInt_L$+i) (640)
    $yInt_i$=Clip3(SubpicTopBoundaryPos, SubpicBotBoundaryPos, $yInt_L$+i) (641)
  Otherwise (subpic_treated_as_pic_flag[CurrSubpicIdx] is equal to 0 or sps_num_subpics_minus1 for the reference picture refPicLX is equal to 0), the following applies:

xInt$_i$=Clip3(0, picW−1, refWraparoundEnabledFlag?
ClipH((PpsRefWraparoundOffset)*MinCbSizeY,
picW, (xInt$_L$+i)): xInt$_L$+i) (642)
yInt$_i$=Clip3(0, picH−1, yInt$_L$+i) (643)

8.5.6.3.2 Luma Sample Interpolation Filtering Process

If subpic_treated_as_pic_flag[CurrSubpicIdx] is equal to 1 and sps_num_subpics_minus1 for the reference picture refPicLX is greater than 0, the following applies:
xInt$_i$=Clip3(SubpicLeftBoundaryPos, SubpicRightBoundaryPos, xInt$_i$) (959)
yInt$_i$=Clip3(SubpicTopBoundaryPos, SubpicBotBoundaryPos, yInt$_i$) (960)
Otherwise (subpic_treated_as_pic_flag[CurrSubpicIdx] is equal to 0 or sps_num_subpics_minus1 for the reference picture refPicLX is equal to 0), the following applies:
xInt$_i$=Clip3(0, picW−1, refWraparoundEnabledFlag?
ClipH((PpsRefWraparoundOffset)*MinCbSizeY,
picW, xInt$_i$): xInt$_i$) (961)
yInt$_i$=Clip3(0, picH−1, yInt$_i$) (962)

8.5.6.3.3 Luma Integer Sample Fetching Process

The luma locations in full-sample units (xInt$_i$, yInt$_i$) are derived as follows:
If subpic_treated_as_pic_flag[CurrSubpicIdx] is equal to 1 and sps_num_subpics_minus1 for the reference picture refPicLX is greater than 0, the following applies:
xInt=Clip3(SubpicLeftBoundaryPos, SubpicRightBoundaryPos, xInt$_L$) (968)
yInt=Clip3(SubpicTopBoundaryPos, SubpicBotBoundaryPos, yInt$_L$) (969)
Otherwise (subpic treated as pie flag[CurrSubpicIdx] is equal to 0 or sps_num_subpics_minus1 for the reference picture refPicLX is equal to 0), the following applies:
xInt=Clip3(0, picW−1, refWraparoundEnabledFlag? (970)
ClipH((PpsRefWraparoundOffset)*MinCbSizeY,
picW, xInt$_L$): xInt$_L$)
yInt=Clip3(0, picH−1, yInt$_L$) (971)

8.5.6.3.4 Chroma Sample Interpolation Process

If subpic_treated_as_pic_flag[CurrSubpicIdx] is equal to 1 and sps_num_subpics_minus1 for the reference picture refPicLX is greater than 0, the following applies:
xInt$_i$=Clip3(SubpicLeftBoundaryPos/SubWidthC,
SubpicRightBoundaryPos/SubWidthC, xInt$_i$) (977)
yInt$_i$=Clip3(SubpicTopBoundaryPos/SubHeightC,
SubpicBotBoundaryPos/SubHeightC, yInt$_i$) (978)
Otherwise (subpic_treated_as_pic_flag[CurrSubpicIdx] is equal to 0 or sps_num_subpics_minus1 for the reference picture refPicLX is equal to 0), the following applies:
xInt$_i$=Clip3(0, picW$_C$−1, refWraparoundEnabledFlag?
ClipH(xOffset, picW$_C$, xInt$_i$):xInt$_C$+i−1) (979)
yInt$_i$=Clip3(0, picH$_C$−1, yInt$_i$) (980)
Alternatively, the highlighted part "and sps_num_subpics_minus1 for the reference picture refPicLX is greater than 0" may be replaced by "and if the reference picture refPicLX is an ILRP having a same spatial resolution with the current picture".

Alternatively, the highlighted part "or sps_num_subpics_minus1 for the reference picture refPicLX is equal to 0" may be replaced by "or if the reference picture refPicLX is an ILRP having a different spatial resolution than the current picture".

Alternatively, the requirement for collocated picture, e.g., "It is a requirement of bitstream conformance that the picture referred to by slice_collocated_ref_idx shall be the same for all slices of a coded picture and shall not be a long-term reference picture." may be replaced by "It is a requirement of bitstream conformance that the picture referred to by slice_collocated_ref_idx shall be the same for all slices of a coded picture and shall not be an inter-layer reference picture".

Alternatively, the requirement for collocated picture, e.g., "It is a requirement of bitstream conformance that the picture referred to by slice_collocated_ref_idx shall be the same for all slices of a coded picture and shall not be a long-term reference picture." may be replaced by "It is a requirement of bitstream conformance that the picture referred to by slice_collocated_ref_idx shall be the same for all slices of a coded picture and shall not be a long-term reference picture or an inter-layer reference picture."

6.2. Alternative Embodiments

In some alternative embodiments, the following constraint in the first embodiment:
When sps_num_subpics_minus1 is greater than 0 and subpic_treated_as_pic_flag[i] is equal to 1, for each CLVS of a current layer referring to the SPS, let targetAuSet be all the AUs starting from the AU containing the first picture of the CLVS in decoding order, to the AU containing the last picture of the CLVS in decoding order, inclusive, it is a requirement of bitstream conformance that all of the following conditions are true for the targetLayerSet that consists of the current layer and all the layers that have the current layer as a reference layer:
All pictures of the AUs in targetAuSet and the layers in targetLayerSet shall have the same value of pic_width_in_luma_samples and the same value of pic_height_in_luma_samples.
All pictures of the AUs in targetAuSet and the layers in targetLayerSet shall have the same value of each of scaling win left offset, scaling win right offset, scaling win top offset, and scaling win bottom offset.
All the SPSs referred to by the layers in targetLayerSet shall have the same value of sps_num_subpics_minus1 and shall have the same values of subpic_ctu_top_left_x[j], subpic_ctu_top_left_y[j], subpic_width_minus1[j], subpic_height_minus1[j], and subpic treated as pic flag[j] respectively, for each value of j in the range of 0 to sps_num_subpics_minus1, inclusive.
All pictures of the AUs in targetAuSet and the layers in targetLayerSet shall have the same value of SubpicIdVal[j] for each value of j in the range of 0 to sps_num_subpics_minus1, inclusive.
is replaced with one of the following:
1) When sps_num_subpics_minus1 is greater than 0 and subpic_treated_as_pic_flag[i] is equal to 1, for each CLVS of a current layer referring to the SPS, let targetAuSet be all the AUs starting from the AU containing the first picture of the CLVS in decoding order, to the AU containing the last picture of the CLVS in decoding order, inclusive, it is a requirement of bitstream conformance that all of the following conditions are true for the targetLayerSet that consists of the current layer and all the layers that have the current layer as a reference layer:
   All pictures of the AUs in targetAuSet and the layers in targetLayerSet shall have the same value of pic_width_in_luma_samples and the same value of pic_height_in_luma_samples.
   All pictures of the AUs in targetAuSet and the layers in targetLayerSet shall have the same value of each of scaling win left offset, scaling win right offset, scaling win top offset, and scaling win bottom offset.
   All the SPSs referred to by the layers in targetLayerSet shall have the same value of sps_num_subpics_minus1 and shall have the same values of subpic_ctu_top_left_x[j], subpic_ctu_top_left_y[j], subpic_width_minus1[j], and subpic_height_minus1[j], respectively, for each value of j in the range of 0 to sps_num_subpics_minus1, inclusive.
   All pictures of the AUs in targetAuSet and the layers in targetLayerSet shall have the same value of SubpicIdVal[j] for each value of j in the range of 0 to sps_num_subpics_minus1, inclusive.
2) When sps_num_subpics_minus1 is greater than 0 and subpic_treated_as_pic_flag[i] is equal to 1, for each CLVS of a current layer referring to the SPS, let targetAuSet be all the AUs starting from the AU containing the first picture of the CLVS in decoding order, to the AU containing the last picture of the CLVS in decoding order, inclusive, it is a requirement of bitstream conformance that all of the following conditions are true for the targetLayerSet that consists of the current layer and all the layers that have the current layer as a reference layer:
   All pictures of the AUs in targetAuSet and the layers in targetLayerSet shall have the same value of pic_width_in_luma_samples and the same value of pic_height_in_luma_samples.
   All pictures of the AUs in targetAuSet and the layers in targetLayerSet shall have the same value of each of scaling win left offset, scaling win right offset, scaling win top offset, and scaling win bottom offset.
   All the SPSs referred to by the layers in targetLayerSet shall have the same value of sps_num_subpics_minus1 and shall have the same values of subpic_ctu_top_left_x[j], subpic_ctu_top_left_y[j], subpic_width_minus1[j], subpic_height_minus1[j], and loop_filter_across_subpic_enabled_flag[j], respectively, for each value of j in the range of 0 to sps_num_subpics_minus1, inclusive.
   All pictures of the AUs in targetAuSet and the layers in targetLayerSet shall have the same value of SubpicIdVal[j] for each value of j in the range of 0 to sps_num_subpics_minus1, inclusive.
3) When subpic_treated_as_pic_flag[i] is equal to 1, for each CLVS of a current layer referring to the SPS, let targetAuSet be all the AUs starting from the AU containing the first picture of the CLVS in decoding order, to the AU containing the last picture of the CLVS in decoding order, inclusive, it is a requirement of bitstream conformance that all of the following conditions are true for the targetLayerSet that consists of the current layer and all the layers that have the current layer as a reference layer:
   All pictures of the AUs in targetAuSet and the layers in targetLayerSet shall have the same value of pic_width_in_luma_samples and the same value of pic_height_in_luma_samples.
   All pictures of the AUs in targetAuSet and the layers in targetLayerSet shall have the same value of each of scaling win left offset, scaling win right offset, scaling win top offset, and scaling win bottom offset.
   All the SPSs referred to by the layers in targetLayerSet shall have the same value of sps_num_subpics_minus1 and shall have the same values of subpic_ctu_top_left_x[j], subpic_ctu_top_left_y[j], subpic_width_minus1[j], subpic_height_minus1[j], and subpic treated as pic flag[j] respectively, for each value of j in the range of 0 to sps_num_subpics_minus1, inclusive.
   All pictures of the AUs in targetAuSet and the layers in targetLayerSet shall have the same value of SubpicIdVal[j] for each value of j in the range of 0 to sps_num_subpics_minus1, inclusive.
4) When sps_num_subpics_minus1 is greater than 0 and subpic_treated_as_pic_flag[i] is equal to 1, for each CLVS of a current layer referring to the SPS, let targetAuSet be all the AUs starting from the AU containing the first picture of the CLVS in decoding order, to the AU containing the last picture of the CLVS in decoding order, inclusive, it is a requirement of bitstream conformance that all of the following conditions are true for the targetLayerSet that consists of the current layer and all the layers that have the current layer as a reference layer:
   All pictures of the AUs in targetAuSet and the layers in targetLayerSet shall have the same value of pic_width_in_luma_samples and the same value of pic_height_in_luma_samples.
   All pictures of the AUs in targetAuSet and the layers in targetLayerSet shall have the same value of each of scaling win left offset, scaling win right offset, scaling win top offset, and scaling win bottom offset.
   All the SPSs referred to by the layers in targetLayerSet shall have the same value of sps_num_subpics_minus1 and shall have the same values of subpic_ctu_top_left_x[j], subpic_ctu_top_left_y[j], subpic_width_minus1[j], subpic_height_minus1[j], subpic treated as pic flag[j], and loop_filter_across_subpic_enabled_flag[j], respectively, for each value of j in the range of 0 to sps_num_subpics_minus1, inclusive.
   All pictures of the AUs in targetAuSet and the layers in targetLayerSet shall have the same value of SubpicIdVal[j] for each value of j in the range of 0 to sps_num_subpics_minus1, inclusive.

Figure 5:
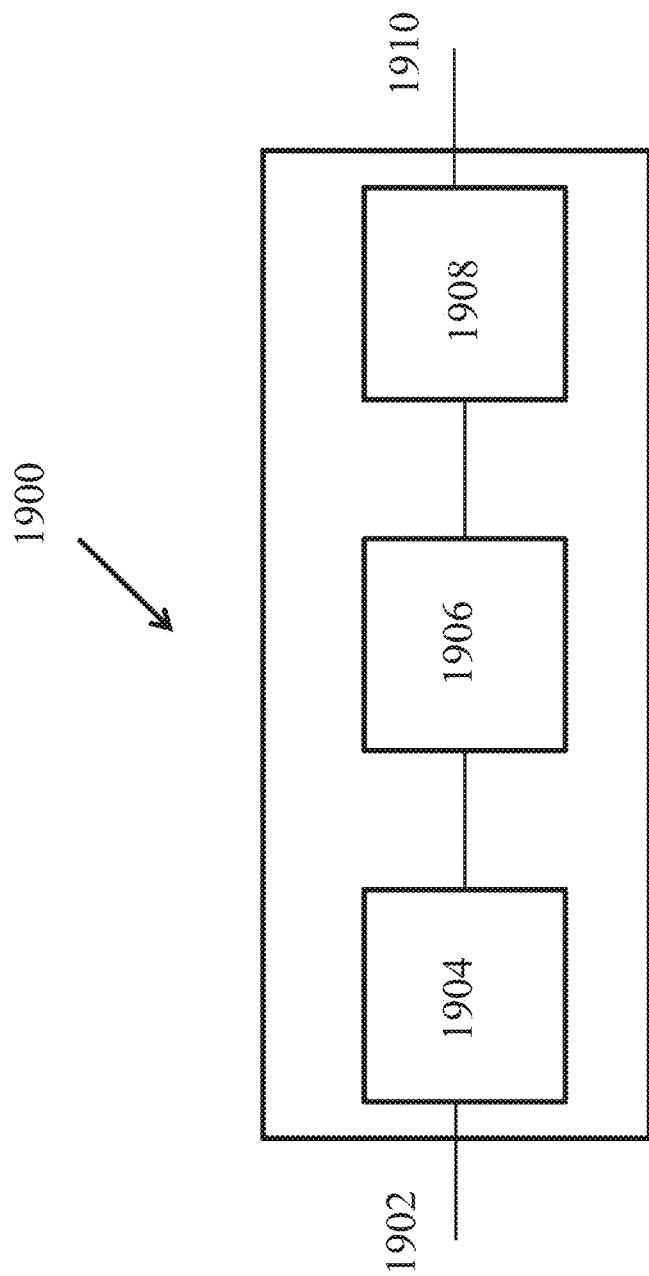
FIG. 5 is a block diagram of an example video processing system.

FIG. 5 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 6:
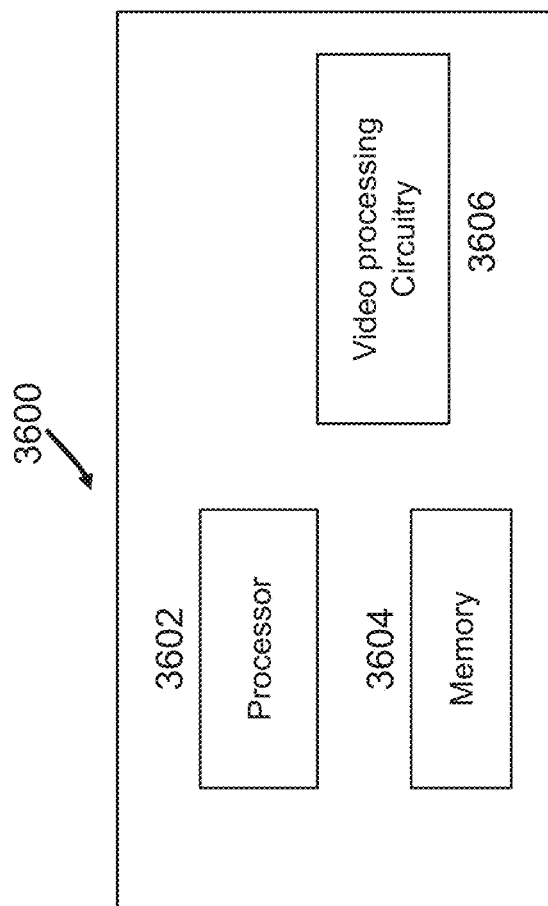
FIG. 6 is a block diagram of a video processing apparatus.

FIG. 6 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document.

Figure 8:
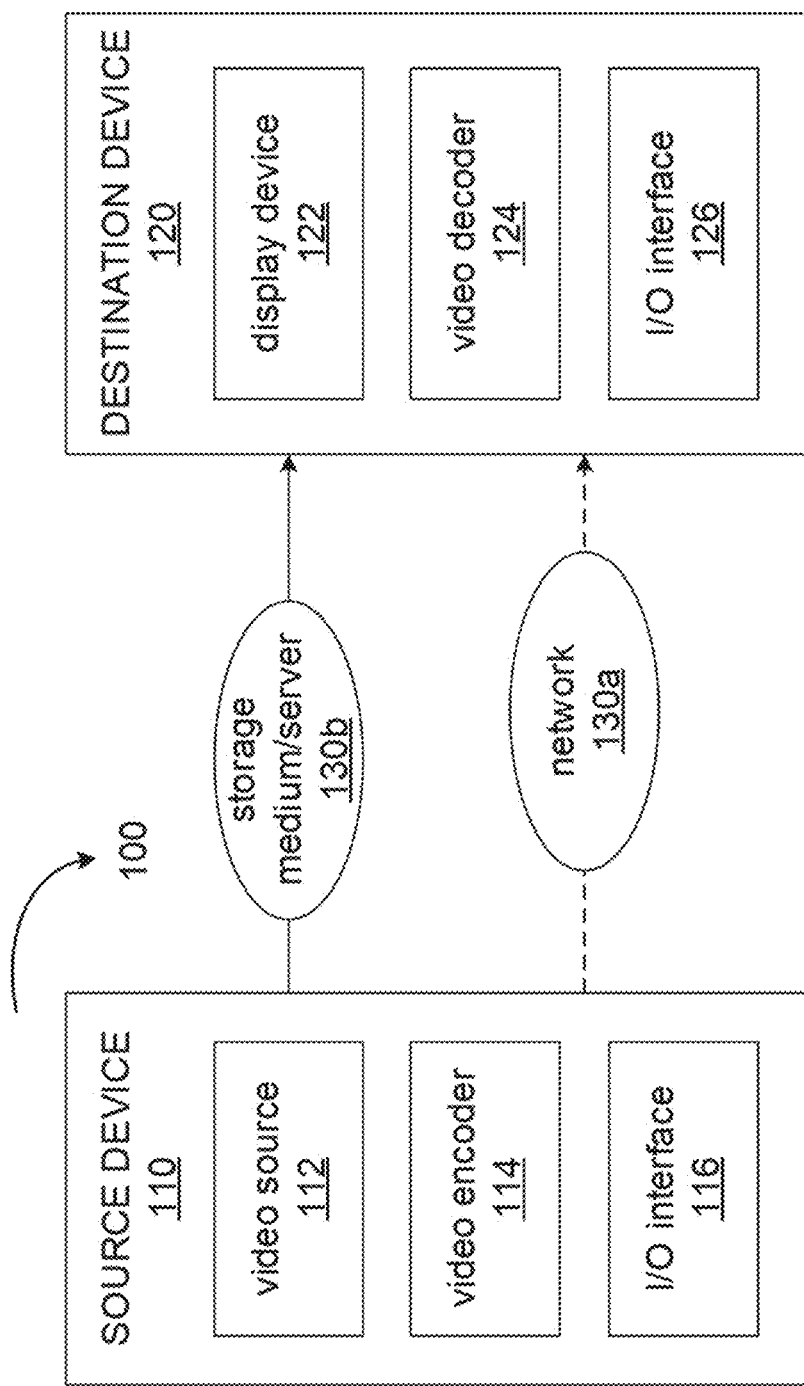
FIG. 8 is a block diagram that illustrates a video coding system in accordance with some embodiments of the present disclosure.

FIG. 8 is a block diagram that illustrates an example video coding system 100 that may utilize the techniques of this disclosure.

As shown in FIG. 8, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding(VVM) standard and other current and/or further standards.

Figure 9:
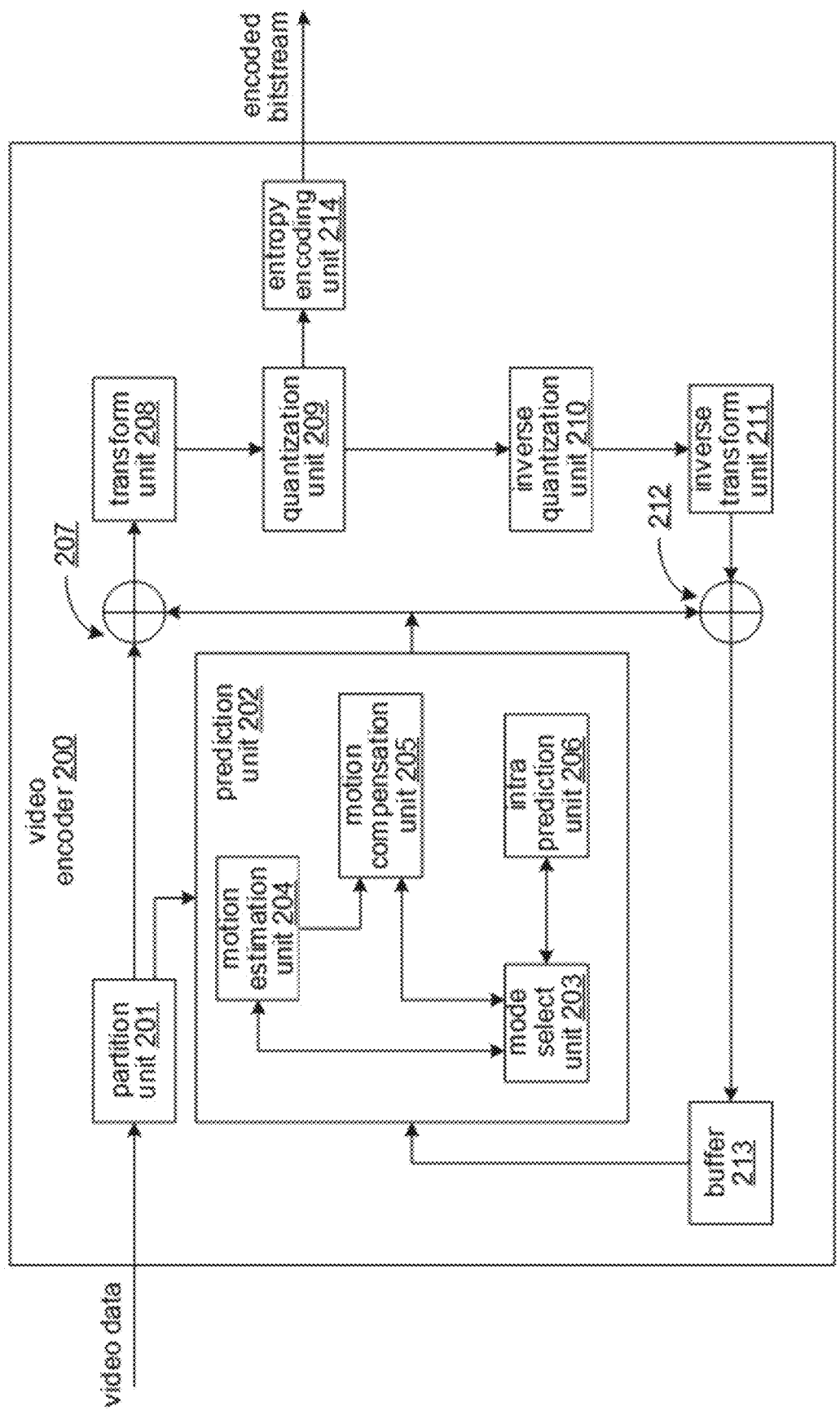
FIG. 9 is a block diagram that illustrates an encoder in accordance with some embodiments of the present disclosure.

FIG. 9 is a block diagram illustrating an example of video encoder 200, which may be video encoder 114 in the system 100 illustrated in FIG. 8.

Video encoder 200 may be configured to perform any or all of the techniques of this disclosure. In the example of FIG. 9, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 9 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 10:
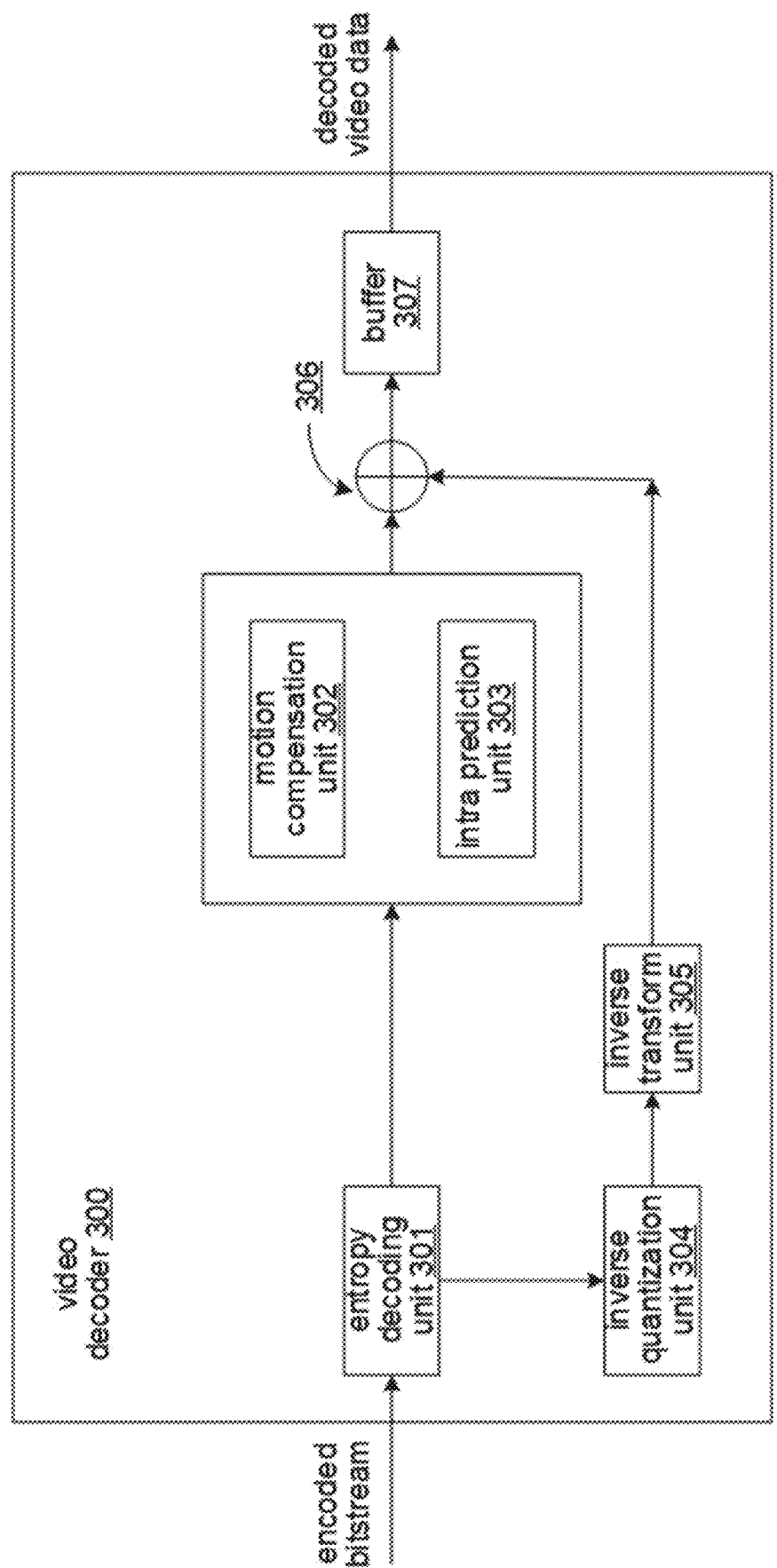
FIG. 10 is a block diagram that illustrates a decoder in accordance with some embodiments of the present disclosure.

FIG. 10 is a block diagram illustrating an example of video decoder 300 which may be video decoder 124 in the system 100 illustrated in FIG. 8.

The video decoder 300 may be configured to perform any or all of the techniques of this disclosure. In the example of FIG. 10, the video decoder 300 includes a plurality of functional components. The techniques described in this disclosure may be shared among the various components of the video decoder 300. In some examples, a processor may be configured to perform any or all of the techniques described in this disclosure.

In the example of FIG. 10, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 9).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, e.g., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of solutions preferred by some embodiments is provided next.

The following solutions show example embodiments of techniques discussed in the previous section (e.g., item 1).

Figure 7:
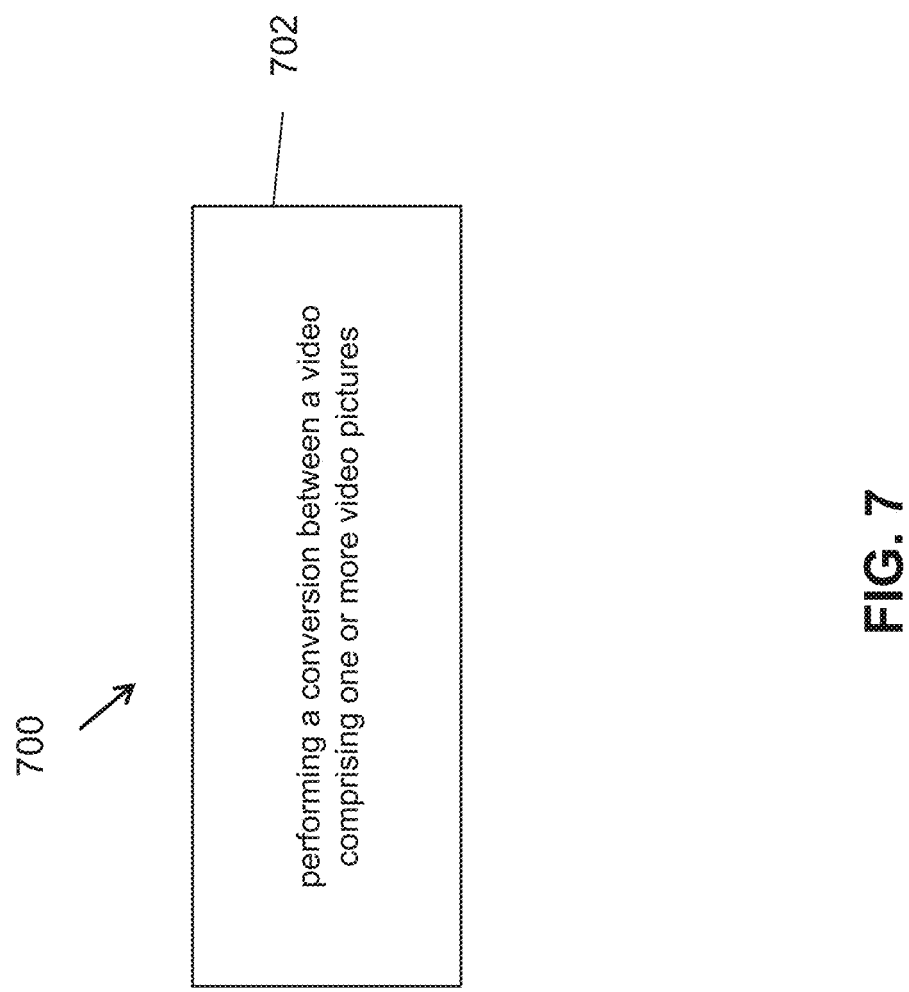
FIG. 7 is a flowchart for an example method of video processing.

1. A video processing method (e.g., method 700 shown in FIG. 7), comprising: performing (702) a conversion between a video comprising one or more video pictures, wherein the coded representation conforms to a format rule; wherein the format rule specifies that two or more syntax fields in a sequence parameter set controls a reference picture resampling (RPR) change in the video.

2. The method of solution 1, wherein a first syntax field of the two or more syntax fields indicates whether the RPR is used for one or more pictures and a second syntax field of the two or more syntax fields indicates whether a picture resolution is allowed to change in the coded representation at a sequence level.

The following solutions show example embodiments of techniques discussed in the previous section (e.g., item 2).

3. A video processing method, comprising: performing a conversion between a video comprising one or more video pictures, wherein the coded representation conforms to a format rule; wherein the format rule specifies that a single syntax field in a sequence parameter set controls a reference picture resolution (RPR) change in the video; and wherein, the format rule specifies that, irrespective of a value of the single syntax field, resampling of an inter-layer reference picture is permitted for the conversion.

The following solutions show example embodiments of techniques discussed in the previous section (e.g., items 3, 5, 6, 7, 9, 10).

4. A video processing method, comprising: performing a conversion between a video comprising one or more layers comprising one or more video pictures comprising one or more subpictures, wherein the coded representation conforms to a format rule; wherein the format rule specifies a first constraint on a cross-layer alignment or a second constraint on a combination of subpictures and scalability of inter-layer pictures.

5. The method of solution 4, wherein the first constraint defines a cross-layer alignment restriction on a current layer and all higher layers that depend on the current layer without imposing an alignment restriction on lower layers of the current layer and all higher layers that do not depend on the current layer.

6. The method of solution 4, wherein the second constraint imposes a cross-layer alignment restriction on all layers in each dependency tree of a particular layer.

7. The method of solution 4, wherein the second constraints restrictions a value of subpic_treated_as_pic_flag[i] according to a cross-layer alignment restriction.

8. The method of solution 4, wherein the second constraints restrictions a value of loop_filter_across_subpic_enabled_flag[i] according to a cross-layer alignment restriction.

9. The method of any of solutions 4 to 8, wherein the first constraint and/or the second constraint are specified for a target set of access units.

10. The method of solution 4, wherein the second constraints restrictions a value of each of the scaling window parameters scaling_win_left_offset, scaling_win_right_offset, scaling_win_top_offset, and scaling_win_bottom_offset according to a cross-layer alignment restriction.

The following solutions show example embodiments of techniques discussed in the previous section (e.g., item 11).

11. A video processing method, comprising: performing a conversion between a video comprising one or more layers comprising one or more video pictures comprising one or more subpictures, wherein the conversion conforms to a format rule that specifies that an inter-layer reference picture or a long term reference picture is disallowed from being a collocated picture of a current picture for the conversion.

The following solutions show example embodiments of techniques discussed in the previous section (e.g., item 12).

12. A video processing method, comprising: performing a conversion between a video comprising multiple pictures and a coded representation of the video, wherein the conversion conforms to a rule that specifies that values of each of scaling_win_left_offset, scaling_win_right_offset, scaling_win_top_offset, and scaling_win_bottom_offset are same for any two pictures within a same coded layer video sequence or coded video sequence having the same values of pic_width_in_luma_samples and pic_height_in_luma_samples.

The following solutions show example embodiments of techniques discussed in the previous section (e.g., item 13).

13. A video processing method, comprising: performing a conversion between a video comprising multiple pictures and a coded representation of the video, wherein the conversion conforms to a rule that specifies that in case that a picture resolution or a scaling window is different for a current picture and other picture in a same access unit, then inter-layer prediction is only allowed when the current picture is an intra random access point picture.

14. The method of any of solutions 1 to 13, wherein the conversion comprises encoding the video into the coded representation.

15. The method of any of solutions 1 to 13, wherein the conversion comprises decoding the coded representation to generate pixel values of the video.

16. A video decoding apparatus comprising a processor configured to implement a method recited in one or more of solutions 1 to 15.

17. A video encoding apparatus comprising a processor configured to implement a method recited in one or more of solutions 1 to 15.

18. A computer program product having computer code stored thereon, the code, when executed by a processor, causes the processor to implement a method recited in any of solutions 1 to 15.

19. A method, apparatus or system described in the present document.

Figure 13:
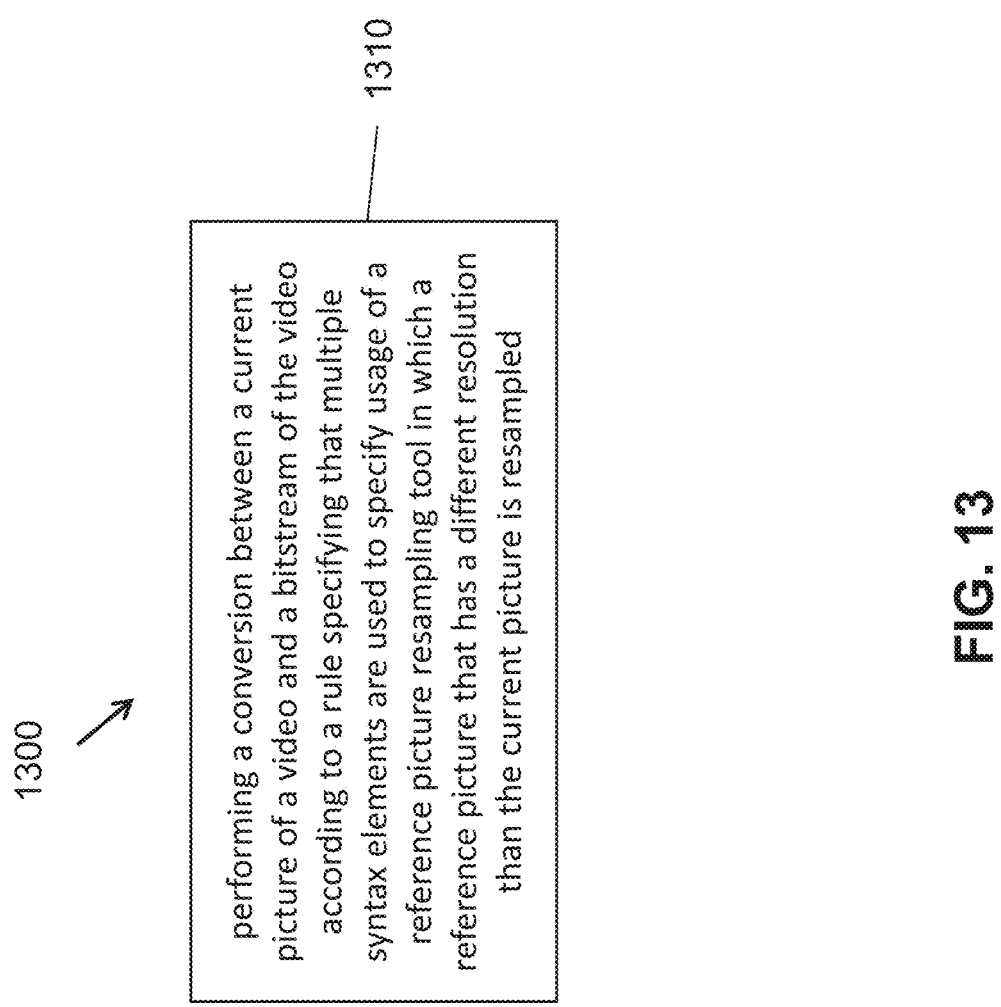
FIG. 13 is a flowchart representation of a method for video processing in accordance with the present technology.

FIG. 13 is a flowchart representation of a method 1300 for video processing in accordance with the present technology. The method 1300 includes, at operation 1310, performing a conversion between a current picture of a video and a bitstream of the video according to a rule. The rule specifies that multiple syntax elements are used to specify usage of a reference picture resampling tool. The reference picture resampling tool is a coding tool in which a reference picture that has a different resolution than the current picture is resampled for the conversion.

In some embodiments, the multiple syntax elements are included in a sequence parameter set (SPS). In some embodiments, the multiple syntax elements include a first syntax element specifying whether the reference picture resampling tool is enabled for the conversion, and a second syntax element specifying whether a resolution of a picture is allowed to change within a Coded Layer Video Sequence (CLVS). In some embodiments, the second syntax element is included in the SPS in case the first syntax element specifies that the reference picture resampling tool is enabled for the conversion. In some embodiments, in case the second syntax element is not included in the SPS, the second syntax element is inferred to be equivalent to a value indicating that a resolution of a picture is disallowed to change within the CLVS. In some embodiments, the first syntax element and the second syntax element are indicated independently of each other for the conversion.

In some embodiments, one or more general constraint flags corresponding to each of the multiple syntax elements are indicated for the conversion. In some embodiments, the rule specifies that a resolution of a picture is disallowed to change within a Coded Layer Video Sequence (CLVS) in case the current picture includes multiple subpictures. In some embodiments, the rule specifies that the reference picture resampling tool is enabled for the conversion in case the current picture includes multiple subpictures. In some embodiments, a constraint flag specifying whether a scaling window offset parameter is present in a picture parameter set is determined based on the first syntax element. In some embodiments, in case the first syntax element indicates that the reference picture resampling tool is disabled for the conversion, the constraint flag specifies that a scaling window offset parameter is omitted in the picture parameter set.

In some embodiments, the multiple syntax elements are included in a video parameter set. In some embodiments, at least one of the multiple syntax elements is applicable to all layers specified by the video parameter set. In some embodiments, at least one of the multiple syntax elements has multiple instances indicated in the video parameter set, and each of the multiple instances is applicable to all layers in a dependency tree. In some embodiments, each of the multiple syntax elements is coded using a unary coding method with one bit.

Figure 14:
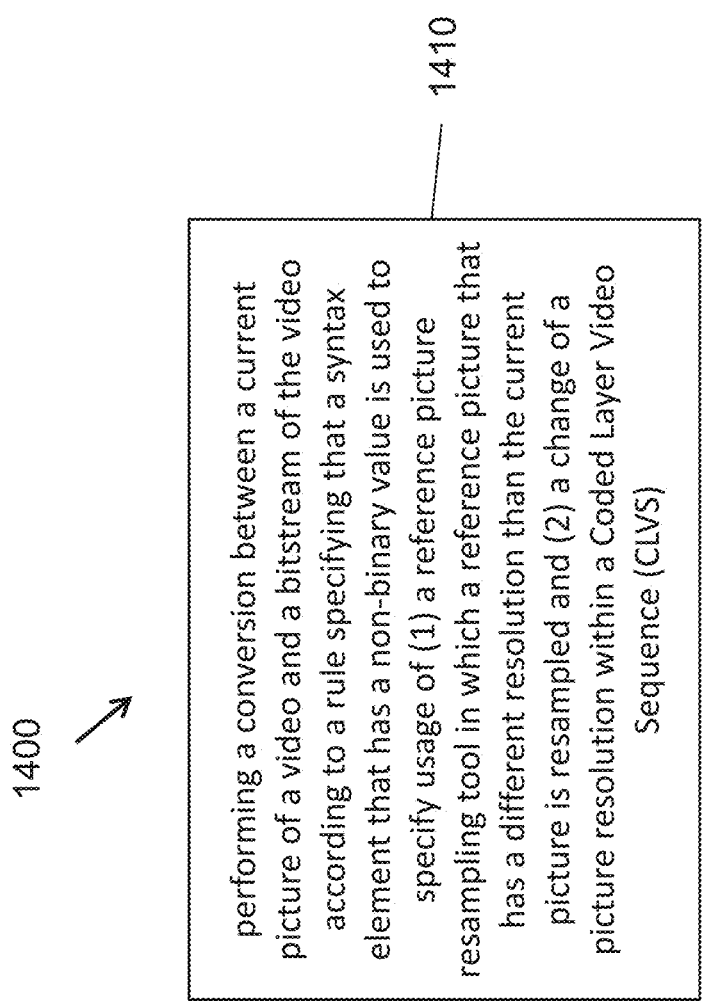
FIG. 14 is a flowchart representation of another method for video processing in accordance with the present technology.

FIG. 14 is a flowchart representation of a method 1400 for video processing in accordance with the present technology. The method 1400 includes, at operation 1410, performing a conversion between a current picture of a video and a bitstream of the video according to a rule. The rule specifies that a syntax element that has a non-binary value is used to specify usage of (1) a reference picture resampling tool in which a reference picture that has a different resolution than the current picture is resampled and (2) a change of a picture resolution within a Coded Layer Video Sequence (CLVS).

In some embodiments, a value of the syntax element being 0 indicates that the reference picture resampling tool is disabled for the conversion. In some embodiments, a value of the syntax element being 1 indicates that the reference picture resampling tool is enabled for the conversion and the change of the picture resolution is disallowed within a Coded Layer Video Sequence (CLVS). In some embodiments, a value of the syntax element being 2 indicates that the reference picture resampling tool is enabled for the conversion and the change of the picture resolution is allowed within a Coded Layer Video Sequence (CLVS). In some embodiments, indication of the syntax element is based on whether an inter-layer prediction coding tool is allowed for the conversion. In some embodiments, the syntax element is an unsigned integer 0-th order Exp-Golobm-coded syntax element. In some embodiments, the syntax element is coded as an unsigned integer using N bits, N being an integer. In some embodiments, N is equal to 2.

FIG. 15 is a flowchart representation of a method 1500 for video processing in accordance with the present technology. The method 1500 includes, at operation 1510, performing a conversion between a video comprising multiple layers and a bitstream of the video according to a rule. The rule specifies that, in case a subpicture is treated as a video picture for the conversion, a cross-layer alignment restriction is applied to less than all of the multiple layers comprising a current layer that includes the subpicture and a subset of layers associated with the current layer. The cross-layer alignment restriction includes a restriction of at least a dimension of the video picture, a number of subpictures within the video picture, a location of at least one subpicture, or an identification of a subpicture.

In some embodiments, the subset of layers includes all higher layers that depend on the current layer. In some embodiments, the subset of layers excludes all lower layers of the current layer and higher layers that do not depend on the current layer. In some embodiments, the subset of layers includes all layers that are higher than the current layer. In some embodiments, the subset of layers includes all higher layers that are in a same output layer set as the current layer. In some embodiments, the subset of layers includes all lower layers that are reference layers of the current layer. In some embodiments, the subset of layers includes all layers that are lower than the current layer. In some embodiments, the subset of layers includes all lower layers that are in a same output layer set as the current layer. In some embodiments, the subset of layers includes all layers that are lower than a highest layer. In some embodiments, the subset of layers includes all layers that are higher than a lowest layer.

FIG. 16 is a flowchart representation of a method 1600 for video processing in accordance with the present technology. The method 1600 includes, at operation 1610, performing a conversion between a current layer of a video and a bitstream of the video according to a rule. The rule specifies that a cross-layer alignment restriction is applied to all layers in a dependency tree associated with the current layer regardless of whether any of the all layers is an output layer in an output layer set. The cross-layer alignment restriction includes a restriction of at least a dimension of a video picture, a number of subpictures within a video picture, a location of at least one subpicture, or an identification of a subpicture. The all layers in the dependency tree include the current layer, all layers that have the current layer as a reference layer, and all reference layers of the current layer.

In some embodiments, the cross-layer alignment restriction further includes a restriction regarding whether a subpicture in a video picture is treated as a picture across the all layers. In some embodiments, the cross-layer alignment restriction does not limit whether a loop filtering operation is applied on boundaries of subpictures within a video picture across the all layers. In some embodiments, the rule further specifies that the cross-layer alignment restriction is not applied in case a syntax element in a sequence parameter set indicates that a video picture includes a single subpicture. In some embodiments, the rule further specifies that the cross-layer alignment restriction is not applied in case a syntax element indicates that subpicture information is omitted in a sequence parameter set. In some embodiments, the rule further specifies that the cross-layer alignment restriction is applied to pictures in a target set of access units. In some embodiments, for each CLVS of the current layer referring to a sequence parameter set, the target set of access units includes all access units starting from a first access unit that includes a first picture of the CLVS to a second access unit that includes a last picture of the CLVS according to a decoding order.

In some embodiments, the cross-layer alignment restriction further includes a scaling window offset parameter, the scaling window offset parameter comprising at least one of (1) a left offset of a scaling window, (2) a right offset of the scaling window, (3) a top offset of the scaling window, or (4) a bottom offset of the scaling window.

FIG. 17 is a flowchart representation of a method 1700 for video processing in accordance with the present technology. The method 1700 includes, at operation 1710, performing a conversion between a current picture of a video and a bitstream of the video according to a rule. The rule specifies that resampling of a reference picture that is in a same layer as the current picture is enabled regardless of a value of a syntax element specifying whether a change of a picture resolution is allowed in a Coded Layer Video Sequence (CLVS).

In some embodiments, in case the syntax element indicates that a change of the picture resolution is disallowed in the CLVS, a reference picture resampling tool in which a reference picture that has a different picture resolution than the current picture is resampled is enabled for the reference picture.

FIG. 18 is a flowchart representation of a method 1800 for video processing in accordance with the present technology. The method 1800 includes, at operation 1810, performing a conversion between a current picture of a video comprising multiple layers and a bitstream of the video according to a rule. The rule specifies one of (1) a reference picture of the current picture is disallowed to be collocated, or (2) in case that the reference picture of the current picture is collocated, motion vectors pointing to the reference picture are used during the conversion of the current picture without scaling. In some embodiments, the reference picture is a long-term reference picture. In some embodiments, the reference picture is an inter-layer reference picture.

FIG. 19 is a flowchart representation of a method 1900 for video processing in accordance with the present technology. The method 1900 includes, at operation 1910, performing a conversion between a video and a bitstream of the video according to a rule. The rule specifies that a scaling window offset parameter is same for any two video pictures in a same Coded Layer Video Sequence (CLVS) or a Coded Video Sequence (CVS) that have a same dimension represented in a number of luma samples.

In some embodiments, the scaling window offset parameter includes at least one of (1) a left offset of a scaling window, (2) a right offset of the scaling window, (3) a top offset of the scaling window, or (4) a bottom offset of the scaling window. In some embodiments, the dimension includes a width or a height of a picture. In some embodiments, the rule further specifies that the any two video pictures belong to a same layer. In some embodiments, the rule further specifies that the any two video pictures belong to two layers comprising a first layer and a second layer. The first layer is a reference layer of the second layer.

FIG. 20 is a flowchart representation of a method 2000 for video processing in accordance with the present technology. The method 2000 includes, at operation 2010, performing a conversion between a current picture of a video and a bitstream of the video according to a rule. The rule specifies that, in response to a picture resolution of the current picture being different than at least one other picture in a same access unit of the current picture, an inter-layer prediction coding tool is enabled only in case that the current picture is an intra random access point (IRAP) picture for which all video coding layer (VCL) network abstraction layer (NAL) units have a same value for a NAL unit type.

In some embodiments, a change of a picture resolution of a reference picture being disallowed indicates that the picture resolution of the reference picture is same as the picture resolution of the current picture. In some embodiments, the picture resolution of a video picture includes a width or a height of the video picture. In some embodiments, the picture resolution of a video picture includes a width, a height, and/or a top-left position of a scaling window or a conformance window of the video picture.

In some embodiments, the conversion comprises encoding the video into the bitstream. In some embodiments, the conversion comprises decoding the bitstream to generate the video.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A video processing method, comprising:
performing a conversion between a video comprising multiple layers and a bitstream of the video according to a rule,
wherein the rule specifies that, in case that a first syntax element included in a sequence parameter set indicating number of subpictures in a video picture is greater than 1, and that a subpicture with a first subpicture index is treated as one video picture for the conversion, a cross-layer alignment restriction is applied to a current layer that includes the subpicture and a subset of layers associated with the current layer,
wherein the cross-layer alignment restriction includes a restriction of a current picture including the subpicture and a first picture in the subset of layers having a same value for at least one of following syntax elements:
a value of the first syntax element,
a value of a second syntax element specifying a dimension of a video picture,
a value of a third syntax element indicating a dimension of an i-th subpicture,
a value of a fourth syntax element indicating a location of the i-th subpicture, or
a value of the first subpicture index.

2. The method of claim 1, wherein the subset of layers associated with the current layer includes one or more higher layers that depend on the current layer.

3. The method of claim 1, wherein the subset of layers associated with the current layer excludes all higher layers that do not depend on the current layer.

4. The method of claim 1, wherein the subset of layers associated with the current layer excludes all lower layers of the current layer.

5. The method of claim 1, wherein the subset of layers associated with the current layer are a subset of a dependency tree associated with the current layer, and
wherein the dependency tree associated with the current layer includes the current layer, all layers that have the current layer as a reference layer, and all reference layers of the current layer.

6. The method of claim 5, wherein the subset of layers associated with the current layer are the subset of the dependency tree regardless of whether any of the subset of the dependency tree is an output layer in an output layer set.

7. The method of claim 1, wherein the cross-layer alignment restriction further includes a restriction regarding a value of a fifth syntax element,
wherein the current layer and the subset of layers associated with the current layer have a same value of the fifth syntax element, and
wherein the fifth syntax element specifies whether the subpicture of each coded picture in a coded layer video sequence is treated as a picture in a decoding process excluding in-loop filtering operations.

8. The method of claim 1, wherein the cross-layer alignment restriction excludes a value of a sixth syntax element, and
wherein the sixth syntax element specifies whether an in-loop filtering operation across subpicture boundaries is enabled.

9. The method of claim 1, wherein the rule further specifies that the cross-layer alignment restriction is not applied in case the first syntax element indicates that the video picture includes a single subpicture.

10. The method of claim 1, wherein the rule further specifies that the cross-layer alignment restriction is not applied in case a seventh syntax element included in a sequence parameter set indicates that subpicture information is not present.

11. The method of claim 1, wherein the rule further specifies that the cross-layer alignment restriction is applied to pictures in a target set of access units.

12. The method of claim 11, wherein, for each Coded Layer Video Sequence (CLVS) of the current layer referring to a sequence parameter set, the target set of access units includes all access units starting from a first access unit that includes a second picture of the CLVS to a second access unit that includes a last picture of the CLVS according to a decoding order.

13. The method of claim 1, wherein the conversion comprises encoding the video into the bitstream.

14. The method of claim 1, wherein the conversion comprises decoding the bitstream to generate the video.

15. An apparatus for processing video data comprising a processor and a non-transitory memory with instructions thereon, wherein the instructions upon execution by the processor, cause the processor to:
perform a conversion between a video comprising multiple layers and a bitstream of the video according to a rule,
wherein the rule specifies that, in case that a first syntax element included in a sequence parameter set indicating number of subpictures in a video picture is greater than 1, and that a subpicture with a first subpicture index of i is treated as one video picture for the conversion, a cross-layer alignment restriction is applied to a current layer that includes the subpicture and a subset of layers associated with the current layer,
wherein the cross-layer alignment restriction includes a restriction of a current picture including the subpicture and a first picture in the subset of layers having a same value for at least one of following syntax elements:
a value of the first syntax element,
a value of a second syntax element specifying a dimension of a video picture,
a value of a third syntax element indicating a dimension of an i-th subpicture,
a value of a fourth syntax element indicating a location of the i-th subpicture, or
a value of the first subpicture index.

16. The apparatus of claim 15, wherein the subset of layers associated with the current layer includes one or more higher layers that depend on the current layer.

17. The apparatus of claim 15, wherein the subset of layers associated with the current layer excludes all higher layers that do not depend on the current layer.

18. A non-transitory computer-readable storage medium storing instructions that cause a processor to:
perform a conversion between a video comprising multiple layers and a bitstream of the video according to a rule,
wherein the rule specifies that, in case that a first syntax element included in a sequence parameter set indicating number of subpictures in a video picture is greater than 1, and that a subpicture with a first subpicture index of i is treated as one video picture for the conversion, a cross-layer alignment restriction is applied to a current layer that includes the subpicture and a subset of layers associated with the current layer, wherein the cross-layer alignment restriction includes a restriction of a current picture including the subpicture and a first picture in the subset of layers having a same value for at least one of following syntax elements:
a value of the first syntax element,
a value of a second syntax element specifying a dimension of a video picture,
a value of a third syntax element indicating a dimension of an i-th subpicture,
a value of a fourth syntax element indicating a location of the i-th subpicture, or
a value of the first subpicture index.

19. A non-transitory computer-readable recording medium storing a bitstream of a video which is generated by a method performed by a video processing apparatus, wherein the method comprises:

generating the bitstream of the video comprising multiple layers according to a rule,
wherein the rule specifies that, in case that a first syntax element included in a sequence parameter set indicating number of subpictures in a video picture is greater than 1, and that a subpicture with a first subpicture index of i is treated as one video picture for a conversion, a cross-layer alignment restriction is applied to a current layer that includes the subpicture and a subset of layers associated with the current layer, wherein the cross-layer alignment restriction includes a restriction of a current picture including the subpicture and a first picture in the subset of layers having a same value for at least one of following syntax elements:
a value of the first syntax element,
a value of a second syntax element specifying a dimension of a video picture,
a value of a third syntax element indicating a dimension of an i-th subpicture,
a value of a fourth syntax element indicating a location of the i-th subpicture, or
a value of the first subpicture index.

20. The method of claim 1, wherein the first picture is a reference picture of the current picture, or the current picture is a reference picture of the first picture.

* * * * *